US011870951B2

(12) United States Patent
Jiang

(10) Patent No.: US 11,870,951 B2
(45) Date of Patent: Jan. 9, 2024

(54) PHOTOGRAPHING METHOD AND TERMINAL

(71) Applicant: HONOR DEVICE CO., LTD., Shenzhen (CN)

(72) Inventor: Dongsheng Jiang, Shenzhen (CN)

(73) Assignee: HONOR DEVICE CO., LTD., Guangdong (CN)

(*) Notice: Subject to any disclaimer, the term of this patent is extended or adjusted under 35 U.S.C. 154(b) by 0 days.

(21) Appl. No.: 17/777,578

(22) PCT Filed: Oct. 25, 2021

(86) PCT No.: PCT/CN2021/126205
§ 371 (c)(1),
(2) Date: May 17, 2022

(87) PCT Pub. No.: WO2022/042776
PCT Pub. Date: Mar. 3, 2022

(65) Prior Publication Data
US 2023/0018557 A1     Jan. 19, 2023

(30) Foreign Application Priority Data
Aug. 27, 2020   (CN) .................... 202010878340.X

(51) Int. Cl.
*H04N 23/60*     (2023.01)
*H04N 23/62*     (2023.01)
(Continued)

(52) U.S. Cl.
CPC ............ *H04N 23/64* (2023.01); *H04N 23/62* (2023.01); *H04N 23/632* (2023.01); *H04N 23/635* (2023.01); *H04N 23/667* (2023.01)

(58) Field of Classification Search
CPC ...... H04N 23/64; H04N 23/62; H04N 23/632; H04N 23/635; H04N 23/667; H04N 23/633
See application file for complete search history.

(56) References Cited

U.S. PATENT DOCUMENTS 11,128,802 B2      9/2021   Peng
2011/0314049 A1*  12/2011   Poirier .................. H04N 23/64
                                                            382/218
(Continued)

FOREIGN PATENT DOCUMENTS

CN       107257439 A      10/2017
CN       108347559 A       7/2018
(Continued)

OTHER PUBLICATIONS

Franz Juliano et al;"Instant Rephotography";Aug. 25, 2019;Advances in Databasea and Information Systems;pp. 208-227.
(Continued)

*Primary Examiner* — Ahmed A Berhan
(74) *Attorney, Agent, or Firm* — WOMBLE BOND DICKINSON (US) LLP

(57) ABSTRACT

Provided are a photographing method and a terminal, relating to the field of electronic devices, and by which a user can be instructed based on a template to adjust a position or an attitude of a mobile phone, to obtain a photo or a video whose composition is the same as or similar to that of the template, thereby improving the user photographing experience. The method specifically includes: after starting a first function of a camera application, an electronic device calculates a moving direction and distance of the electronic device and/or calculates a rotation direction or a rotation angle of the electronic device based on a target template selected by a user and a currently acquired preview and through feature point matching or an AR repositioning
(Continued)

technology, so that the electronic device can photograph a photo or a video whose composition is the same as that of the target template.

20 Claims, 15 Drawing Sheets

(51) Int. Cl.
*H04N 23/63* (2023.01)
*H04N 23/667* (2023.01)

(56) References Cited

U.S. PATENT DOCUMENTS

| | | | | |
|---|---|---|---|---|
| 2014/0267868 A1* | 9/2014 | Mazzola | ............... | H04N 23/635 |
| | | | | 348/333.02 |
| 2015/0077574 A1* | 3/2015 | Jayaraj | ................. | H04N 23/632 |
| | | | | 348/333.01 |

FOREIGN PATENT DOCUMENTS

| | | |
|---|---|---|
| CN | 108924412 A | 11/2018 |
| CN | 109547694 A | 3/2019 |
| CN | 110225244 A | 9/2019 |
| CN | 110381250 A | 10/2019 |
| CN | 110445984 A | 11/2019 |
| CN | 111147744 A | 5/2020 |
| CN | 111327828 A | 6/2020 |
| CN | 111355889 A | 6/2020 |
| CN | 111416940 A | 7/2020 |

OTHER PUBLICATIONS

Andre Le;"Augmented Reality Photography Assistant";Technical Disclosure Commons; Nov. 30, 2017;Retrieved from the internet,URL:http://www.tdcommons.org/dpubs_series/837.

* cited by examiner

PHOTOGRAPHING METHOD AND TERMINAL

This application is a National Stage of International Application PCT/CN2021/126205, filed Oct. 25, 2021, which claims priority to Chinese Patent Application No. 202010878340.X, filed Aug. 27, 2020, both of which are hereby incorporated by reference in their entireties.

TECHNICAL FIELD

Embodiments of this application relates to the field of electronic devices, and in particular, to a photographing method and a terminal.

BACKGROUND

The photographing function in electronic devices has become one of the functions often used by users. However, ordinary users do not have professional framing and composition techniques, which easily leads to the fact that photos or videos photographed cannot meet expectations of the users, the film production rate is low, and the user photographing experience is poor.

SUMMARY

Embodiments of this application provide a photographing method and a terminal, by which a user can be instructed based on a template to adjust a position or an attitude of a mobile phone during photographing by the user, to obtain a photo or a video whose composition is the same as or similar to that of the template, thereby improving the user photographing experience.

To achieve the foregoing objective, the embodiments of this application provide the following technical solutions:

A first aspect provides a photographing method. The method includes: starting a camera application and displaying a first interface, where the first interface includes a first control for enabling a first function; displaying a second interface in response to a first user operation acting on the first control, where the second interface includes a second control and the second control is used for selecting a target template; displaying a third interface in response to a second user operation of selecting the target template, where the third interface includes a first preview; displaying instruction information, where the instruction information is used for instructing a user to move a position of an electronic device and/or an attitude of the electronic device; and displaying a fourth interface, where the fourth interface includes a second preview and composition of the second preview is the same as that of the target template.

It can be seen that a photo or a video with reasonable and beautiful composition is selected as the target template, and then a moving direction and a moving distance of the electronic device are calculated or the rotation direction and the rotation angle of the electronic device are calculated based on the target template and the preview currently displayed by the electronic device, to instruct the user to move the position of the electronic device and/or the attitude of the electronic device. When the preview of the electronic device and the target template have the same composition, the user performs photographing. In this way, even an ordinary user who does not have professional framing and composition techniques can also photograph a photo or a video with reasonable and beautiful composition, thereby improving the user photographing experience.

In a possible implementation, when the target template includes a character, the instruction information is further used for instructing a character to be photographed to move a position and/or adjust a pose.

In other words, the method according to this embodiment of this application not only can instruct to photograph a scene photo or video with the same composition as the target template, but also can instruct to photograph a character photo or video with the same pose as the character in the target template, thereby satisfying different photographing requirements of users.

In a possible implementation, that composition of the second preview is the same as that of the target template comprises at least one of the following: the second preview and the target template each include a first object, and a position of the first object in the second preview is the same as a position of the first object in the target template; the second preview and the target template each include a first type of object, and a position of the first type of object in the second preview is the same as a position of the first type of object in the target template; and the second preview and the target template each include a character, and a position and/or a pose of the character in the second preview is the same as a position and/or a pose of the character in the target template, respectively, where the character in the second preview and the character in the target template are a same person or different persons.

It should be noted that the same composition in this embodiment of this application means that the composition of the scene or the character in the target template and the second preview is substantially the same. The scene in the target template and the scene in the second preview are not necessarily the same object, and the position and the attitude of the electronic device when the target template is photographed are not necessarily exactly the same as the position and the attitude of the electronic device when the second preview is photographed.

In a possible implementation, before displaying instruction information, the method further includes: performing feature point matching on the target template and the first preview, and calculating a moving direction and a moving distance of the electronic device and/or calculating an attitude rotation direction and a rotation angle of the electronic device based on corresponding positions of feature points with a same name in the target template and the first preview.

It can be seen that this embodiment of this application provides a method for calculating the moving direction and the moving distance of the electronic device and/or calculating the attitude rotation direction and the rotation angle of the electronic device by the method of feature point matching. In this solution, the target template may be an ordinary photo or video, or a photo or video with a photographing position.

In a possible implementation, before displaying instruction information, the method further includes: displaying first prompt information, for prompting the user to move the electronic device or rotate the electronic device; acquiring, by the electronic device, a plurality of first images in a process in which the user moves the electronic device or rotates the electronic device; calculating the current position and attitude of the electronic device based on the plurality of first images and the first preview; and calculating a moving direction and a moving distance of the electronic device and/or calculating an attitude rotation direction and a rotation angle of the electronic device based on the current position and attitude of the electronic device and anchor information of the target template.

It can be seen that this embodiment of this application provides another method for calculating the moving direction and the moving distance of the electronic device and/or calculating the attitude rotation direction and the rotation angle of the electronic device by the method of AR repositioning. In this solution, the target template is a photo or video carrying anchor information.

In a possible implementation, the method further includes: displaying a fifth interface, where the fifth interface displays a third control for indicating to photograph the target template; displaying, in response to detecting a third user operation acting on the third control, second prompt information, for prompting the user to move the electronic device or rotate the electronic device; acquiring a plurality of second images in the process in which the user moves the electronic device or rotates the electronic device and determining a map based on the plurality of second images; photographing a third image in response to detecting a fourth user operation for indicating photographing; and determining anchor information of the third image based on the map and the third image, where the anchor information of the third image includes a position and an attitude of the electronic device when photographing the third image, and the map.

Therefore, the method for photographing a photo or a video carrying anchor information is provided. The photo or video carrying the anchor information can be used as a local target template of the electronic device; or, can be uploaded to a server and pushed to another electronic device for being downloaded and used as a target template.

In a possible implementation, after the displaying a fourth interface, where the fourth interface includes a second preview, the method further includes: photographing a first photo or recording a first video in response to detecting a fifth user operation for indicating photographing, where when the target template is a photo, composition of the first photo is the same as that of the target template, and composition of a first frame image in the first video is the same as that of the target template; or when the target template is a video, composition of at least one frame image in the first video is the same as that of at least one frame image in the target template.

In other words, when the selected target template is a photo, composition of a photographed photo is the same as that of the target template, and composition of a first frame image in a recorded video is the same as that of the target template. When the selected target template is a video, a video with the same duration as the target template may be recorded, and each frame image in the recorded video is the same as each frame image in the target template. Alternatively, a video with duration different from that of the target template may also be recorded. A frame extraction process may be performed on the target template, so that some image frames in the recorded video have the same composition as the image frames extracted from the target template. For example, a first frame image and a last frame image of the recorded video have the same composition as a first frame image and a last frame image of the target template, respectively.

In a possible implementation, that when the target template is a video, composition of at least one frame image in the first video is the same as that of at least one frame image in the target template specifically includes: when the target template is a video, composition of each frame image in the first video is the same as that of each frame image in the target template; or, composition of a first frame image and a last frame image in the first video is the same as that of a first frame image and a last frame image in the target template, respectively; or, composition of at least two frame images in the second video is the same as that of at least two frame images in the target module.

In a possible implementation, the displaying instruction information, where the instruction information is used for instructing a user to move a position of an electronic device and/or an attitude of the electronic device specifically includes: displaying, in the first preview, an arrow or AR navigation or animation, for instructing the user to move the position of the electronic device and/or the attitude of the electronic device.

In a possible implementation, the method further includes: sending one or more of the instruction information, a preview acquired by the electronic device, and the target template to another electronic device, for instructing the character to be photographed to move the position and/or adjust the pose.

In this way, the character to be photographed can adjust the position and pose thereof based on the instruction information on the another electronic device, so as to photograph a character photo or video with the same composition as the target template.

In a possible implementation, the second user operation of selecting the target template includes: an operation of selecting the target template from photos or videos stored locally by the electronic device; or an operation of selecting the target template from photos or videos pushed by a server.

In a possible implementation, the photographing position of the electronic device includes a distance between the electronic device and a photographed object and a height of the electronic device from ground; or, the photographing position of the electronic device includes a current GPS position of the electronic device.

In a possible implementation, the starting a camera application and displaying a first interface, where the first interface includes a first control for enabling a first function includes: after starting the camera application, displaying a third preview acquired by the electronic device; and when similarity between the third preview and a photo or an image frame of a video in a gallery of the electronic device is greater than a first threshold, displaying the first interface, where the first interface comprises the first control for enabling the first function.

In other words, after starting the camera, photos or videos in the gallery may be traversed. When it is detected that the gallery includes a photo or a video having a specific similarity with the preview currently acquired by the electronic device, the user may be prompted of whether to enable the first function, to use the photo or the video in the gallery as the target template for photographing.

In a possible implementation, the starting a camera application and displaying a first interface, where the first interface comprises a first control for enabling a first function includes: after starting the camera application, photographing a second photo or recording a second video in response to a sixth user operation for indicating photographing; and when similarity between the second photo or an image frame of the second video and a photo or an image frame of a video in the gallery of the electronic device is greater than a second threshold, displaying the first interface, where the first interface includes the first control for enabling the first function.

In other words, after starting the camera to photograph the photo or the video, photos or videos in the gallery are traversed. When it is detected that the gallery includes a photo or a video having a specific similarity with the photographed photo or video, the user may be prompted of whether to enable the first function, to use the photo or the video in the gallery as the target template for photographing.

In a possible implementation, the photo or the video in the gallery of the electronic device has position information; and the starting a camera application and displaying a first interface, where the first interface includes a first control for enabling a first function further includes: after starting the camera application, when the gallery includes a photo or a video whose distance from the current position of the electronic device is less than a third threshold, displaying the first interface, where the first interface includes the first control for enabling the first function; or after starting the camera application, when the gallery includes a photo or a video whose month and day is the same as that of a current date and whose distance from the current position of the electronic device is less than a fourth threshold, displaying the first interface, where the first interface includes the first control for enabling the first function.

In some examples, the mobile phone may also prompt the user to perform "Same Scenario" photographing based on a "Today that Year" feature. For example, the mobile phone first traverses the gallery and determines that a photo/video was photographed on the same day N years ago ("month" and "day" in the date are the same) and the picture/video has position information; then determines that a distance between a current position of the mobile phone and the position where the photo is photographed on the same day N years ago is less than a threshold A; and then prompts, through notification bar prompt information/screen lock prompt information/camera interface prompt information, the user that a photo/video was photographed here N years ago and asks the user whether to enable the "Same Scenario" photographing function. N is a positive integer greater than or equal to 1. In this way, the user can be prompted to use the "Same Scenario" photographing function to photograph a photo/video that was photographed on the same day N years ago and stores position information.

In some other examples, the mobile phone may also prompt, based on a photo/video in a user's favorites, the user to perform "Same Scenario" photographing. For example, the mobile phone traverses the gallery and determines that a distance between a current position of the mobile phone and a position in position information included in the photo/video in the user's favorites is less than a threshold B; or the mobile phone determines that a distance between a current position of the mobile phone and a position in position information included in the photo/video in the user's favorites is less than a threshold B and that the current position of the mobile phone is not a resident position of the user (for example, a site such as a home or a company of the user), and asks the user whether it is needed to enable the "Same Scenario" photographing function. In this way, the user can be prompted to use the "Same Scenario" photographing function to photograph a photo/video that is collected and stores position information.

In a possible implementation, the method further includes: obtaining a photographing parameter of the target template and prompting the user of whether to use the photographing parameter of the target template, wherein the photographing parameter comprises one or more of a photographing mode, a filter parameter, and a beauty parameter.

In this way, it is convenient for the user to quickly photograph a photo or video with the same visual effect as the target template. It can be understood that, compared with a photo photographed using a camera based on an old photograph, optionally, a photo photographed using a camera based on an actual scene/character has more parameters.

A second aspect provides an electronic device, including a processor, a memory, and a touch screen, where the memory and the touch screen are coupled to the processor, the memory is configured to store computer program code, the computer program code comprises computer instructions, and when the processor reads the computer instructions from the memory, the electronic device is caused to perform the photographing method according to the foregoing aspects and any one of the possible implementations thereof.

A third aspect provides an apparatus, included in an electronic device, where the apparatus has a function of implementing the functions of the electronic device in the method according to the foregoing aspects and any one of the possible implementations thereof. The function can be implemented by hardware, and can also be implemented by hardware executing corresponding software. The hardware or the software includes at least one module or unit corresponding to the foregoing function, for example, a receiving module or unit, a display module or unit, a processing module or unit, and the like.

A fourth aspect provides a computer-readable storage medium, including computer instructions, where the computer instructions, when run on a terminal, cause the terminal to perform the method according to the foregoing aspects and any one of the possible implementations thereof.

A fifth aspect provides a graphics user interface on an electronic device. The electronic device is provided with a display, a camera, a memory, and one or more processors. The one or more processors are configured to execute one or more computer programs stored in the memory, and the graphics user interface includes a graphics user interface displayed when the electronic device performs the method according to the foregoing aspects and any one of the possible implementations thereof.

A sixth aspect provides a computer program product, where the computer program product, when run on a computer, causes the computer to perform the method according to the foregoing aspects and any one of the possible implementations thereof.

A seventh aspect provides a chip system, including a processor, where the processor, when executing instructions, performs the method according to the foregoing aspects and any one of the possible implementations thereof.

An eighth aspect further provides a server, including one or more processors, a memory, and a communications module. The server receives a picture and/or a video sent by an electronic device. Specifically, the server may be used by users to register accounts and upload template photos/template videos. The server optionally classifies and stores the photos uploaded by the users. For example, the server performs classification based on GPS position information or anchor information carried in the photos or the videos and stores the photos or the videos in categories. For another example, the server performs searching based on content of the photos or the videos, to identify prominent buildings/scenes in the photos or the videos, and stores the photos or the videos in categories. For another example, the server identifies based on content of the picture or the video, analyzes composition of the picture or the video, and performs classification based on rule-of-thirds composition, equal ratio composition, mirror image composition, or the like. For another example, the server performs identification based on content of the pictures or the videos, analyzes scenarios of the pictures or the videos, and classifies the pictures or the videos based on scenarios such as beaches, coastlines, buildings, and portraits.

In a possible implementation, the server receives a request sent by the electronic device for obtaining a template photo or a template video. For example, the request carries GPS position information or anchor information, and the server optionally selects a similar photo or video from the memory based on the GPS position information or the anchor information and returns the photo or the video to the electronic device. For another example, when the request carries a picture, the server optionally analyzes the picture, selects one or more dimension from a plurality of dimensions described above, selects an appropriate photo, and returns the picture to the electronic device. Optionally, the server returns a photo to the electronic device. Alternatively, the server returns a plurality of photos to the electronic device for the user to select.

In a possible implementation, the server receives scores sent by the electronic device and sorts priorities of the template pictures or videos. The user optionally scores a photo template or a video template after using the photo template or the video template. The electronic device may send the user's score to the server. After receiving the scores, the server sorts the stored photo templates or picture templates based on the scores, so as to perform recommendation based on different priorities according to the scores when recommending a photo template or a picture template to a user.

DESCRIPTION OF EMBODIMENTS

In the description of the embodiments of this application, unless otherwise specified, the character "I" indicates "or".

For example, A/B may indicate A or B. In the text, "and/or" merely describes an association relationship between associated objects, and indicates that three relationships may exist. For example, A and/or B may indicate the following cases: Only A exists, both A and B exist, and only B exists.

In the following, the terms "first" and "second" are used for descriptive purposes only and cannot be understood as indicating or implying relative importance or implying the number of technical features indicated. Therefore, a feature defined as "first" or "second" may explicitly or implicitly include one or more of such feature. In the description of the embodiments of this application, "a plurality of" means two or more unless otherwise specified.

In the embodiments of this application, the words "exemplary" or "for example" are used as examples, illustrations, or explanation. Any embodiment or design described as "exemplary" or "for example" in the embodiments of this application should not be construed as being more preferred or advantageous than other embodiments or design. To be specific, the use of the words "exemplary" or "for example" is intended to present the relevant concepts in a specific manner.

For example, the photographing method according to this embodiment of this application may be applied to an electronic device having at least one camera. The electronic device may be, for example, a mobile phone, a tablet computer, a personal computer (personal computer, PC), a personal digital assistant (personal digital assistant, PDA), a netbook, a wearable electronic device (for example, a smart watch, a smart bracelet, or the like), a smart camera, an augmented reality (augmented reality, AR) device, a virtual reality (virtual reality, VR) device, a vehicle-mounted device, a smart screen, a smart car, a smart audio, a robot, or the like. This application does not impose special restrictions on the specific form of the electronic device.

Figure 1:
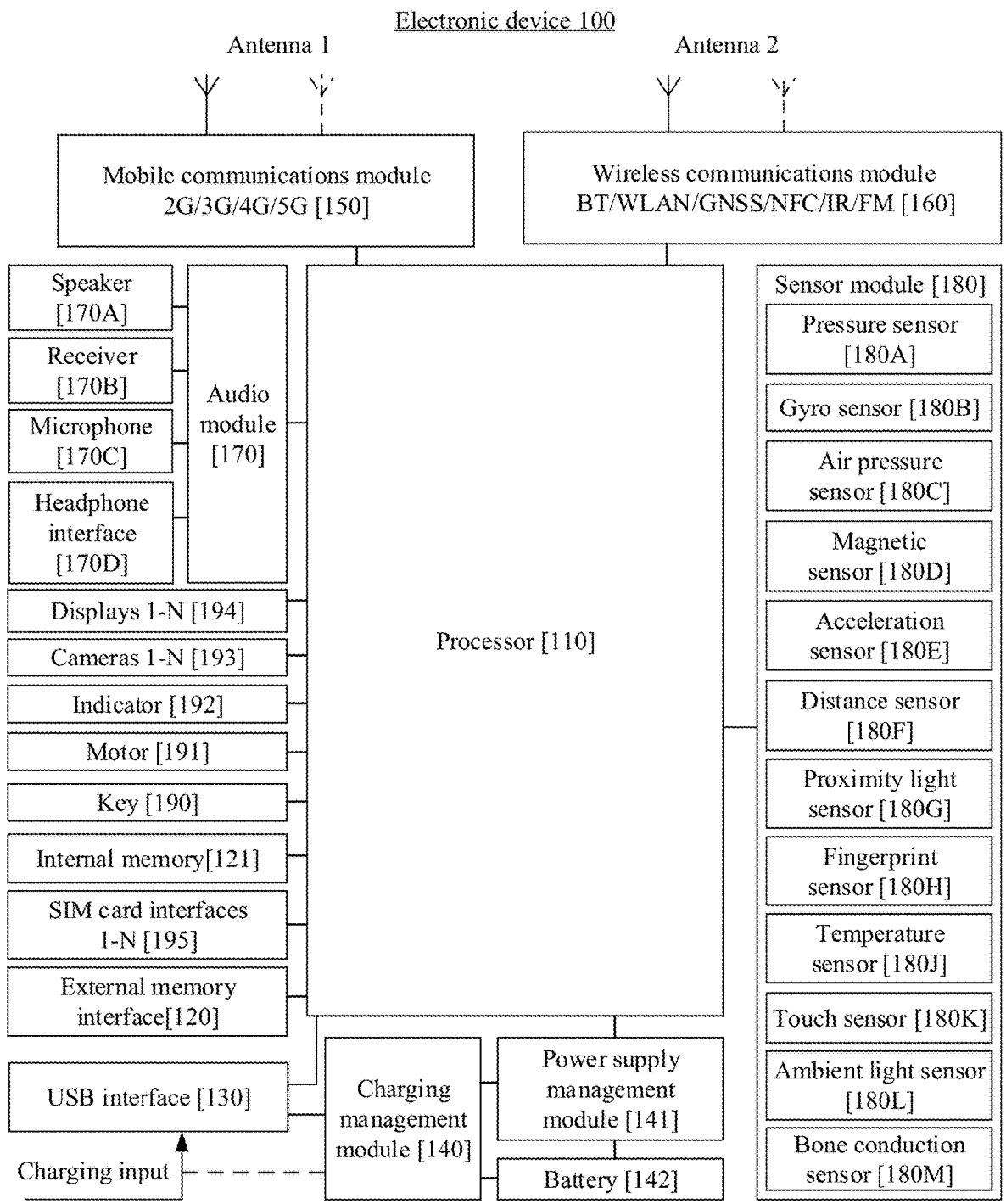
FIG. 1 is a schematic structural diagram of an electronic device according to an embodiment of this application.

FIG. 1 illustrates a schematic structural diagram of an electronic device 100.

The electronic device 100 may include a processor 110, an external memory interface 120, an internal memory 121, a universal serial bus (universal serial bus, USB) interface 130, a charge management module 140, a power supply management module 141, a battery 142, an antenna 1, an antenna 2, a mobile communications module 150, a wireless communications module 160, an audio module 170, a speaker 170A, a receiver 170B, a microphone 170C, a headphone interface 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, an air pressure sensor 180C, a magnetic sensor 180D, an acceleration sensor 180E, a distance sensor 180F, a proximity light sensor 180G, a fingerprint sensor 180H, a temperature sensor 180J, a touch sensor 180K, an ambient light sensor 180L, a bone conduction sensor 180M, and the like.

It may be understood that, the schematic structure provided in the embodiments of the present invention does not constitute specific limitation to the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modulation and demodulation processor, a graphics processing unit (graphics processing unit, GPU), an image signal processor (image signal processor, ISP), a controller, a video encoder and decoder, a digital signal processor (digital signal processor, DSP), a baseband processor, and/or a neural-network processing unit (neural-network processing unit, NPU), and the like. Different processing units may be separate devices, or may be integrated into one or more processors.

The controller may generate an operation control signal based on instruction operation code and a timing signal and implement control of taking an instruction and executing the instruction. The processor 110 may be further provided with a memory for storing instructions and data. In some embodiments the memory in processor 110 is a cache memory. The memory may store instructions or data that have just been used or recycled by the processor 110. If the processor 110 needs to reuse the instructions or data, the processor 110 may invoke the instructions or data directly from the memory. Repeated accesses are avoided and waiting time of the processor 110 is reduced, thereby improving system efficiency.

In some embodiments, the processor 110 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface, and the like. It may be understood that the interface connection relationship between the modules illustrated in this embodiment of the present invention is only a schematic description and does not constitute a structural limitation to the electronic device 100. In other embodiments of this application, the electronic device 100 may also adopt a different interface connection mode or a combination of a plurality of interface connection modes in the foregoing embodiments.

The charge management module 140 is configured to receive a charge input from the charger. The charger may be a wireless charger or a wired charger. In some embodiments of wired charging, the charge management module 140 may receive a charging input from a wired charger through a USB interface 130. In some embodiments of wireless charging, the charge management module 140 may receive a wireless charging input through a wireless charging coil of the electronic device 100. When charging the battery 142, the charge management module 140 may further supply power to the electronic device through the power supply management module 141.

The power supply management module 141 is configured to connect the battery 142, the charge management module 140, and the processor 110. The power supply management module 141 receives an input from the battery 142 and/or the charge management module 140 to supply power to the processor 110, the internal memory 121, the display 194, the camera 193, and the wireless communications module 160 or the like. The power supply management module 141 may further be configured to monitor parameters such as battery capacity, battery cycle times, battery health status (leakage or impedance), and the like. In other embodiments, the power supply management module 141 may alternatively be disposed in the processor 110. In other embodiments, the power supply management module 141 and the charge management module 140 may alternatively be disposed in the same device.

The wireless communication function of the Electronic Device 100 may be implemented by the antenna 1, the antenna 2, the mobile communications module 150, the wireless communications module 160, the modulation and demodulation processor, and the baseband processor, or the like.

The antenna 1 and the antenna 2 are configured to transmit and receive electromagnetic wave signals. Each antenna in the electronic device 100 may be used to cover a single or a plurality of communication frequency bands. Different antennas may further be multiplexed to improve the utilization rate of the antennas. For example, the antenna 1 may be multiplexed to a diversity antenna of a wireless local area network. In other embodiments, the antennas may be used in combination with a tuning switch.

The mobile communications module 150 may provide a solution including wireless communication such as 2G/3G/4G/5G applied on the electronic device 100. In some embodiments, at least some of the functional modules of the mobile communications module 150 may be disposed in the processor 110. In some embodiments, at least some of the functional modules of the mobile communications module 150 may be disposed in the same device as at least some of the modules of the processor 110.

The wireless communications module 160 may provide a wireless communication solution, including a wireless local area network (wireless local area networks, WLAN) (such as a wireless fidelity (wireless fidelity, Wi-Fi) network), bluetooth (bluetooth, BT), global navigation satellite system (global navigation satellite system, GNSS), frequency modulation (frequency modulation, FM), near field communication (near field communication, NFC), infrared (infrared, IR), and the like, applied to the electronic device 100. The wireless communications module 160 may be one or more devices integrating at least one communication processing module. The wireless communications module 160 receives electromagnetic waves via the antenna 2, modulates and filters the electromagnetic wave signal, and transmits the processed signal to the processor 110. The wireless communications module 160 may alternatively receive a signal to be sent from the processor 110, modulate and amplify the signal, and convert the signal into electromagnetic waves through the antenna 2 to be radiated.

In some embodiments, the antenna 1 of the electronic device 100 is coupled to the mobile communications module 150 and the antenna 2 is coupled to the wireless communications module 160, so that the electronic device 100 may communicate with a network and other devices through the wireless communication technology. The wireless communication technologies may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR technologies, and the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or satellite based augmentation systems (satellite based augmentation systems, SBAS).

The electronic device 100 implements a display function through a GPU, a display 194, an application processor, or the like. The GPU is a microprocessor for image processing and connects the display 194 and the application processor. The GPU is configured to perform mathematical and geometric calculations and to render graphics. The processor 110 may include one or more GPUs that execute program instructions to generate or change display information.

The display 194 is configured to display an image, a video, and the like. The display 194 includes a display panel. The display panel may adopt a liquid crystal display (liquid crystal display, LCD), organic light-emitting diodes (organic light-emitting diode, OLED), active matrix organic light-emitting diodes (active matrix organic light-emitting diodes, AMOLED) or active-matrix organic light-emitting diodes (active-matrix organic light-emitting diodes, AMOLED), flexible light-emitting diodes (flexible light-emitting diodes, FLED), Minilized, MicroLed, Micro-oLed, quantum dot light-emitting diodes (quantum dot light-emitting diodes, QLED), or the like. In some embodiments, the electronic device 100 may include one or N displays 194. N is a positive integer greater than 1.

The electronic device 100 may implement a photographing function through an ISP, a camera 193, a video encoder and decoder, a GPU, a display 194, an application processor, or the like.

The ISP is configured to process data fed back by the camera 193. For example, during photographing, a shutter is opened, a light ray is transmitted to a camera photosensitive element through a lens, and an optical signal is converted into an electrical signal, which is transmitted to the ISP for processing and converted into an image visible to naked eyes. The ISP may further perform algorithm optimization on the noise, brightness, and skin color of the image. The ISP may further perform parameter optimization on exposure, color temperature, or a like of the photographing scenario. In some embodiments, the ISP may be disposed in the camera 193.

The camera 193 is configured to capture a still image or video. An optical image of an object is generated through a lens and is projected to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts the optical signal to an electrical signal, which is then transmitted to the ISP for conversion into a digital image signal. The ISP outputs the digital image signal to the DSP for processing. The DSP converts the digital image signal into an image signal of a standard RGB or YUV format. In some embodiments, the electronic device 100 may include one or N cameras 193. N is a positive integer greater than 1.

The digital signal processor is configured to process a digital signal, in addition to which, the digital signal processor may also process other digital signals. For example when the electronic device 100 is selecting a frequency point, the digital signal processor is configured to perform a Fourier transform or the like on the energy of the frequency point.

The video encoder and decoder is configured to compress or decompress a digital video. The electronic device 100 may support one or more video encoders and decoders. In this way, the electronic device 100 may play or record videos of a plurality of encoding formats, for example, a moving picture experts group (MPEG) 1, an MPEG2, an MPEG3, an MPEG4, and the like.

An NPU is a neural-network (neural-network, NN) computing processor. By using the structure of a biological neural network, for example, a transmission mode between neurons of a human brain, the NPU can process the input information quickly and learn by itself continuously. The NPU may implement applications such as image recognition, face recognition, voice recognition, text understanding, and the like of the electronic device 100.

The external memory interface 120 may be configured to connect an external memory card such as a Micro SD card, to enable extension of the storage capacity of the electronic device 100. The external memory card communicates with the processor 110 through the external memory interface 120 to implement a data storage function. For example, music, video, and other files are saved in the external memory card.

The internal memory 121 may be configured to store computer executable program code, including instructions. The internal memory 121 may include a program storage area and a data storage area. The program storage area may store an operating system, an application program required for at least one function (for example, a sound playback function, an image playback function, or the like), and the like. The data storage area may store data (for example, audio data, a phone book, or the like) created during use of the electronic device 100. In addition, the internal memory 121 may include a high-speed random access memory and may further include a non-volatile memory such as at least one disk storage device, flash memory device, universal flash storage (universal flash storage, UFS), or the like. The processor 110 executes the functional applications and data processing of the electronic device 100 by executing instructions stored in the internal memory 121 and/or instructions stored in a memory provided in the processor.

The electronic device 100 may implement an audio function through an audio module 170, a speaker 170A, a receiver 170B, a microphone 170C, a headphone interface 170D, an application processor, or the like, for example, music playing or recording.

In addition, the key 190 includes a power-on key, a volume key, and the like. The key 190 may be a mechanical key, or a touch key. The electronic device 100 may receive a key input and generate key signal input related to user settings and function control of the electronic device 100. The motor 191 may generate a vibration prompt. The motor 191 may be configured for an incoming call vibration prompt or for a touch vibration feedback. For example, touch operations acting on different applications (for example, photographing, audio playback, or the like) may correspond to different vibration feedback effects. The motor 191 may also correspond to different vibration feedback effects for touch operations acting on different areas of the display 194. Different application scenarios (for example, time reminder, information receipt, alarm clock, game, or the like) may also correspond to different vibration feedback effects. The touch vibration feedback effect may also support customization. The indicator 192 may be an indicator light, may be configured to indicate a state of charge or a change in charge, or may be configured to indicate a message, a missed call, a notification, and the like. The SIM card interface 195 is configured to connect a SIM card. The SIM card may be contacted and detached from the electronic device 100 by inserting into or removing from the SIM card interface 195. The electronic device 100 may support 1 or N SIM card interfaces. N is a positive integer greater than 1.

The technical solutions described in the following embodiment can all be implemented in the electronic device 100 having the hardware architecture described above.

For example, the electronic device 100 is a mobile phone. The technical solution according to this embodiment of this application is described in detail with reference to the accompanying drawings.

Figure 2A:
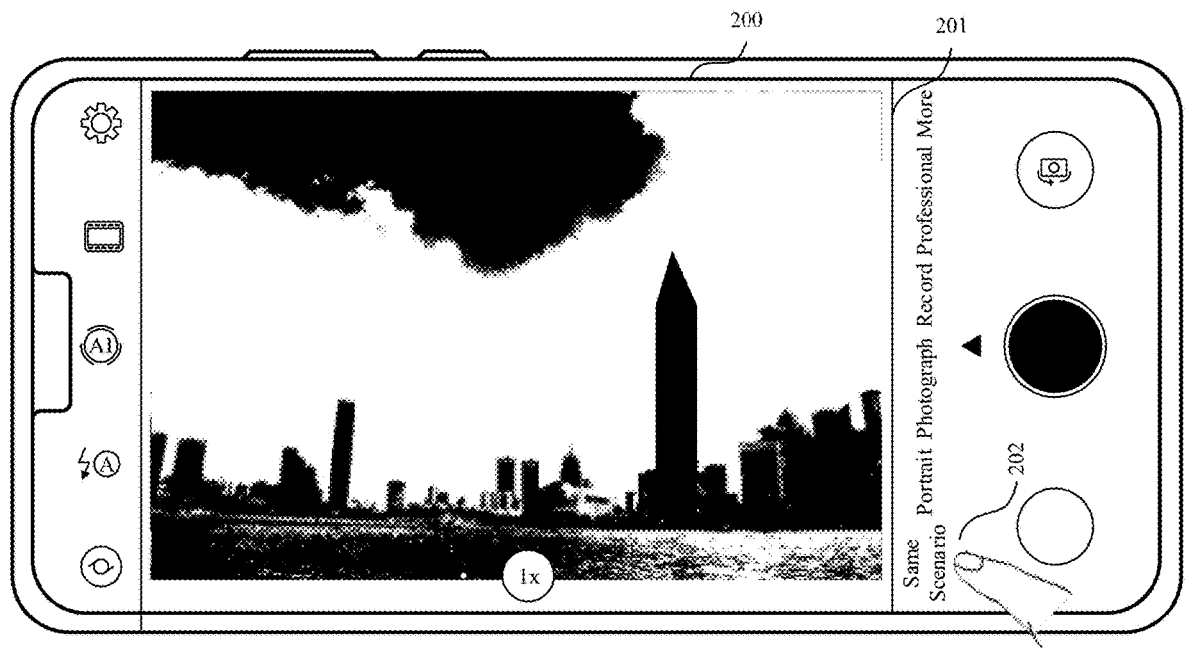
FIG. 2A to FIG. 2E are schematic diagrams of graphics user interfaces of some electronic devices according to embodiments of this application.

For example, the user starts a camera application, which may be a native camera application of the mobile phone, a multifunctional camera application developed by a third party, or the like. In response to receipt of an operation of starting the camera application by the user, the mobile phone may display a photographing interface 200 shown in FIG. 2A. The camera application may enable a "Photograph" function by default, and the photographing interface 200 includes a viewfinder frame 201, and functional controls such as "Portrait", "Photograph", "Record", "Professional", and "More". In some examples, as shown in FIG. 2A, the photographing interface 200 also includes a first functional control 202. A user may enable a first function of the mobile phone by operating the first functional control 202.

The first function is instructing a user to adjust a photographing position of the mobile phone and/or an attitude of the mobile phone (specifically the attitude of the camera) or the like based on a target template (including a photo template or a video template) selected by the user (for example, selected from a mobile phone side or selected from a server) or recommended by the server, so that a photo or a video photographed by the user can achieve the same or similar framing composition as the target template, thereby improving the user photographing experience. In this embodiment of this application, the function that the mobile phone instructs the user to adjust the photographing position of the mobile phone and/or the attitude of the mobile phone based on the target template is also referred to as the "Same Scenario" photographing function. The "Same Scenario" photographing function specifically includes a "Same Scenario" photographing function and a "Same Scenario" recording function. After the photographing function of the same scenario is enabled, the mobile phone instructs the user to adjust the photographing position and/or the attitude of the mobile phone based on the photo template, so as to obtain a photo with the same or similar composition as the photo template. After the recording function of the same scenario is enabled, the mobile phone instructs the user to adjust the photographing position or the attitude of the mobile phone based on the video template, so as to obtain a video with the same or similar composition as each frame image in the video template. Alternatively, the mobile phone instructs the user to adjust the photographing position of the mobile phone or the attitude of the mobile phone based on the photo template, so that the first frame image in the recorded video has the same or similar composition as the photo template.

The photographing position of the mobile phone refers to a geographical position of the mobile phone (which, to specific, may be a camera) when photographing a photo or video, for example, including a photographing distance and a photographing height. The photographing distance refers to a distance between the camera and a photographed object. When photographing with the same zoom magnification, a closer distance between the camera and the photographed object indicates a smaller range that the camera can photograph and indicates a larger area that the object to be photographed occupies in the picture. On the contrary, a larger photographing range of the camera is indicated, and the object appears to be smaller. The photographing height refers to a height of the camera from the ground. In addition, given that the photographing position is unchanged, when the attitude of the mobile phone is different, the mobile phone photographs images of different sides of the photographed object. The attitude of the mobile phone refers to a change in a rotation angle of the mobile phone on three mutually perpendicular coordinate axes, including a change in a pitch angle, a yaw angle, and a roll angle.

The photographing position of the mobile phone may also exist in the form of GPS position information plus elevation information.

Figure 2B:
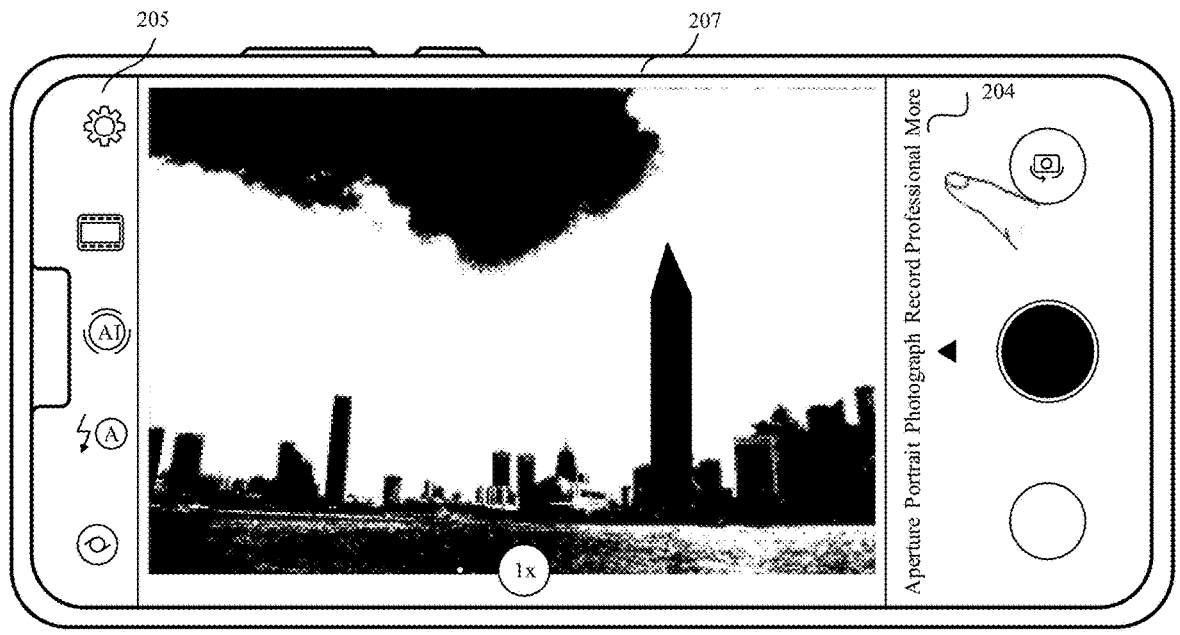
Figure 2C:
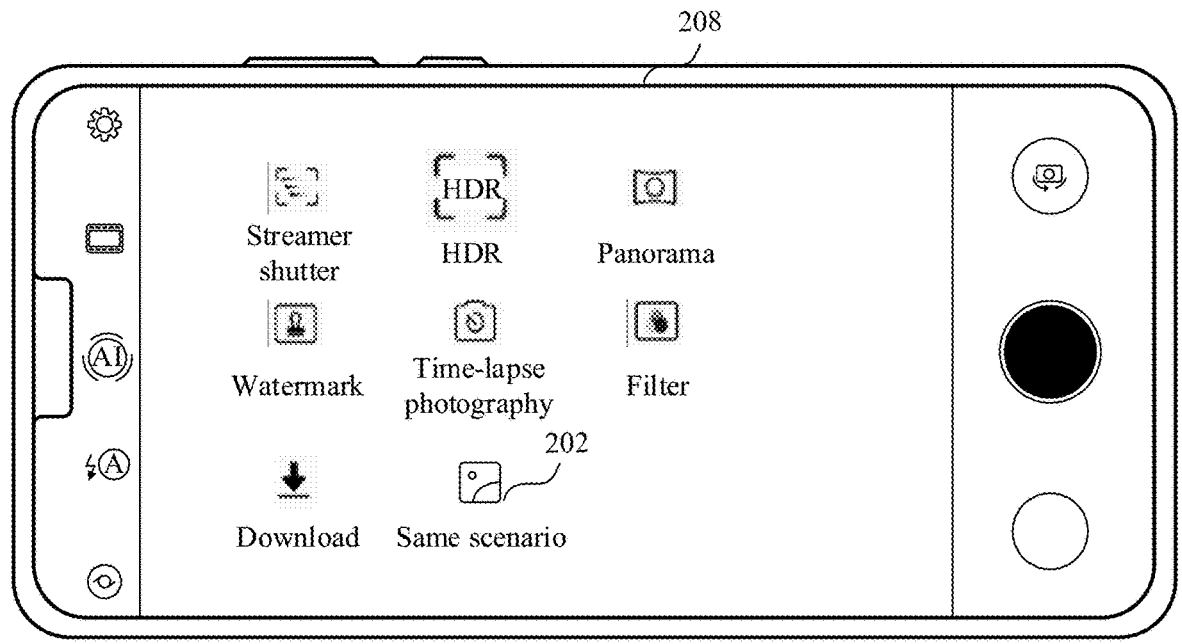

In some other examples, as shown in FIG. 2B, in response to that the user operates a "More" control 204 in the photographing interface 207, the mobile phone opens an option menu 208 of more functional controls, as shown in FIG. 2C, and a first functional control 202 is provided in the option menu 208. Alternatively, the user may open a setting option interface of the camera application by operating a "Setting" control 205 in the photographing interface 207, and the first functional control 202 may be set in the setting option interface.

Figure 2D:
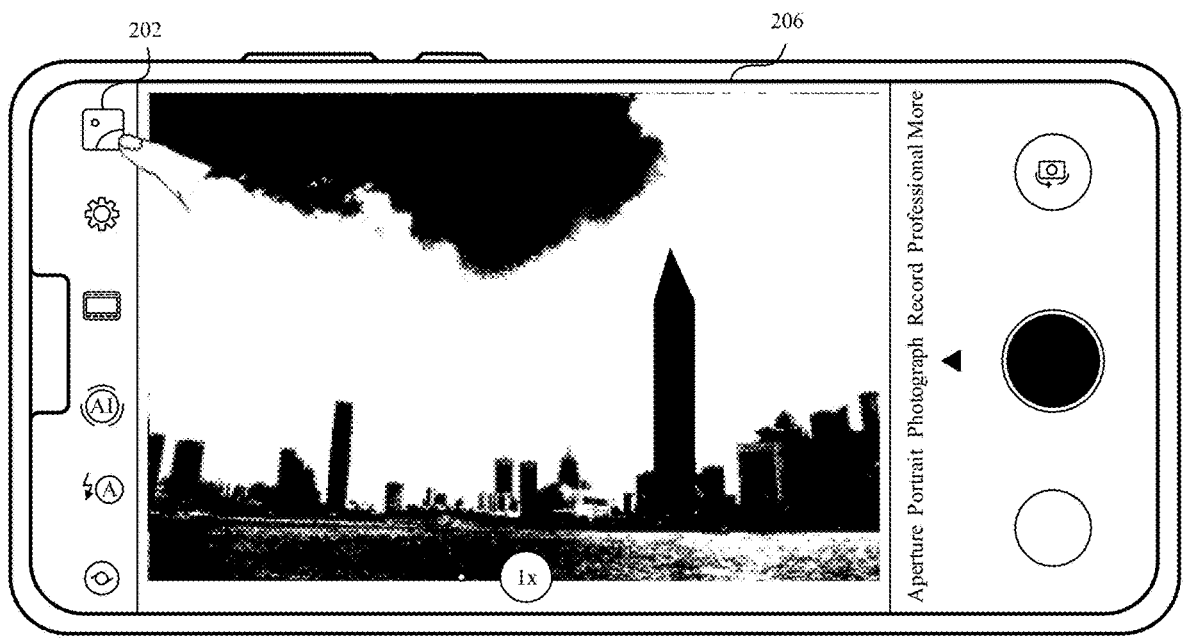
Figure 2E:
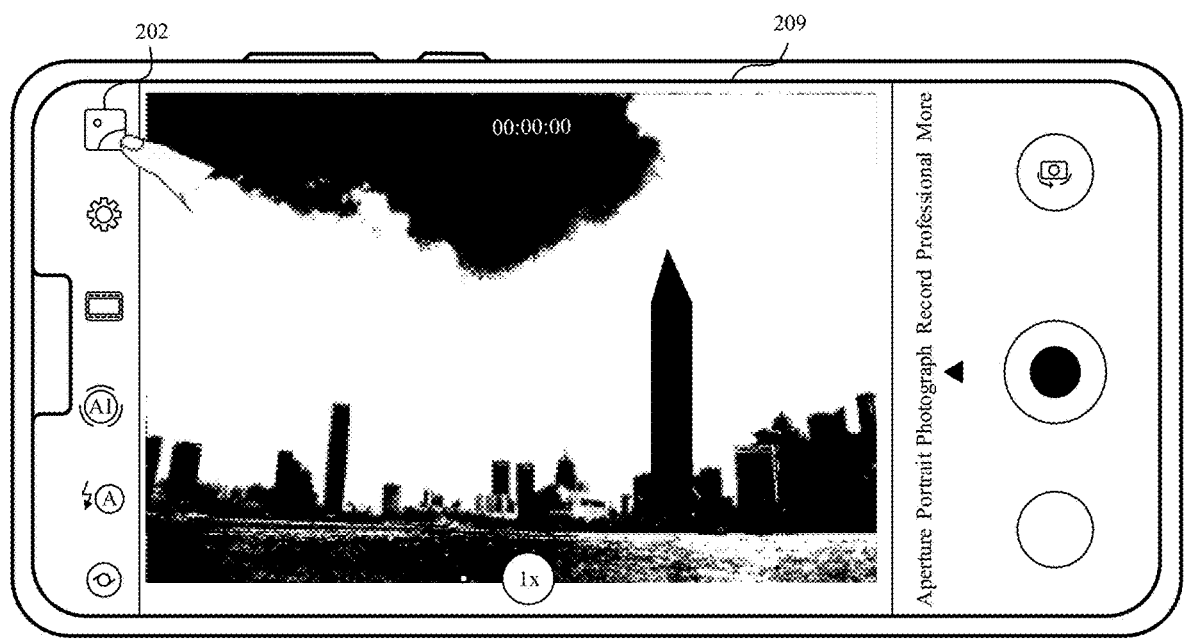

In still other examples, as shown in FIG. 2D, the first functional control 202 may also be provided in a photographing interface 206 of a "Photograph" function. Alternatively, as shown in FIG. 2E, the first functional control 202 is provided in a photographing interface 209 of a "Record" function. The user may quickly enable the first function through the first functional control 202 when using the "Photograph" function or the "Record" function. For example, when the user uses the "Photograph" function, after the first function is enabled through the first functional control 202, the mobile phone starts the "Same Scenario" photographing function by default. For another example, when the user uses the "Record" function, after the first function is enabled through the first functional control 202, the mobile phone starts the "Same Scenario" recording function by default. It may be understood that the "Photograph" function corresponding to the "Same Scenario" photographing function and the "Record" function corresponding to the "Same Scenario" recording function mentioned herein are only optional correspondences, and it is further necessary to decide to enable the "Same Scenario" photographing function or the "Same Scenario" recording function depending on whether the template selected by the user is a picture or a video.

It should be noted that this embodiment of this application is not limited to the setting position of the first functional control 202 and the manner in which the user operates the first functional control 202. Certainly, the user may also enable the first function in other ways, such as executing a predefined pose from a distance, inputting a voice command, pressing a physical control, or drawing a predefined pattern on a touch screen of the mobile phone.

In some possible embodiments, the mobile phone may also prompt the user to perform "Same Scenario" photographing based on a "Today that Year" feature. For example, the mobile phone first traverses the gallery and determines that a photo/video was photographed on the same day N years ago ("month" and "day" in the date are the same) and the picture/video has position information; then determines that a distance between a current position of the mobile phone and the position where the photo is photographed on the same day N years ago is less than a threshold A; and then prompts, through notification bar prompt information/screen lock prompt information/camera interface prompt information, the user that a photo/video was photographed here N years ago and asks the user whether to enable the "Same Scenario" photographing function. N is a positive integer greater than or equal to 1. In this way, the user can be prompted to use the "Same Scenario" photographing function to photograph a photo/video that was photographed on the same day N years ago and stores position information.

In some possible embodiments, the mobile phone may also prompt, based on a photo/video in a user's favorites, the user to perform "Same Scenario" photographing. For example, the mobile phone traverses the gallery and determines that a distance between a current position of the mobile phone and a position in position information included in the photo/video in the user's favorites is less than a threshold B; or the mobile phone determines that a distance between a current position of the mobile phone and a position in position information included in the photo/video in the user's favorites is less than a threshold B and that the current position of the mobile phone is not a resident position of the user (for example, a site such as a home or a company of the user), and asks the user whether it is needed to enable the "Same Scenario" photographing function. In this way, the user can be prompted to use the "Same Scenario" photographing function to photograph a photo/video that is collected and stores position information.

In some possible embodiments, when the user starts the camera application to photograph a photo, the mobile phone may further intercept a screenshot of a preview interface and compare it in the gallery, so as to ask the user whether the "Same Scenario" photographing function needs to be enabled for a picture/video with a high similarity. In this way, the user can be prompted to use the "Same Scenario" photographing function to photograph some photos/videos that do not store position information.

In some possible embodiments, when the user starts the camera application to photograph a photo, the mobile phone may further perform comparison in the gallery after the user photographs a photo/a segment of video, so as to ask the user whether the "Same Scenario" photographing function needs to be enabled for a picture/video with a high similarity. In this way, the user can be prompted to use the "Same Scenario" photographing function to photograph some photos/videos that do not store position information.

Hereinafter, description is provided, for example, a first function is enabled by a user by operating the first functional control 202 on the interface 200 shown in FIG. 2A or on the option menu 208 shown in FIG. 2C.

Figure 3A:
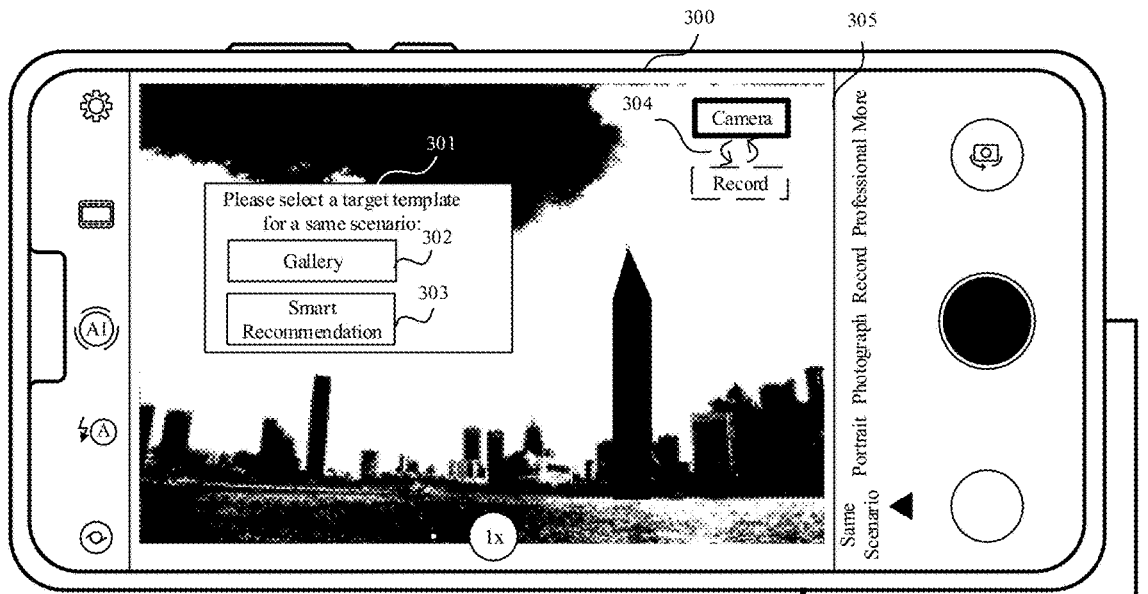
FIG. 3A to FIG. 3C are schematic diagrams of graphics user interfaces of some electronic devices according to embodiments of this application.

In some embodiments, in response to that the user operates the first functional control 202, the mobile phone may enable the photographing function in the same scenario by default, and display a photographing interface 300 shown in FIG. 3A, in which a prompt box 301 is displayed, to prompt the user to select a target template. Optionally, the photographing interface 300 may also include a switching control 304 that can be used to switch from the "Same Scenario" photographing function to the "Same Scenario" recording function. Certainly, in other embodiments, in response to that the user operates the first functional control 202, the mobile phone may first prompt the user to select the "Same Scenario" photographing function or the "Same Scenario" recording function. Then, the user is prompted to select the corresponding target template. In still other embodiments, the mobile phone may also prompt, in response to that the user operates the first functional control 202, the user to select a target template. When the target template selected by the user is a photo template, the "Same Scenario" photographing function is automatically enabled. When the target template selected by the user is a video template, the mobile phone automatically enables the "Same Scenario" recording function. Certainly, subsequently the user may also switch between the "Same Scenario" photographing function and the "Same Scenario" recording function through the switching control 304.

The photographing interface 300 shown in FIG. 3A is returned. In some examples, the prompt box 301 of the photographing interface 300 includes a "Gallery" control 302 and a "Smart Recommendation" control 303. The user may select a photo from a local gallery application through the "Gallery" control 302 as the target template for photographing this time. Alternatively, the user may also request the mobile phone to recommend a related photo based on a preview displayed in a current viewfinder frame 305 through the "Smart Recommendation" control 303, and then the user selects, from recommended photos, a target template for photographing this time.

Figure 3B:
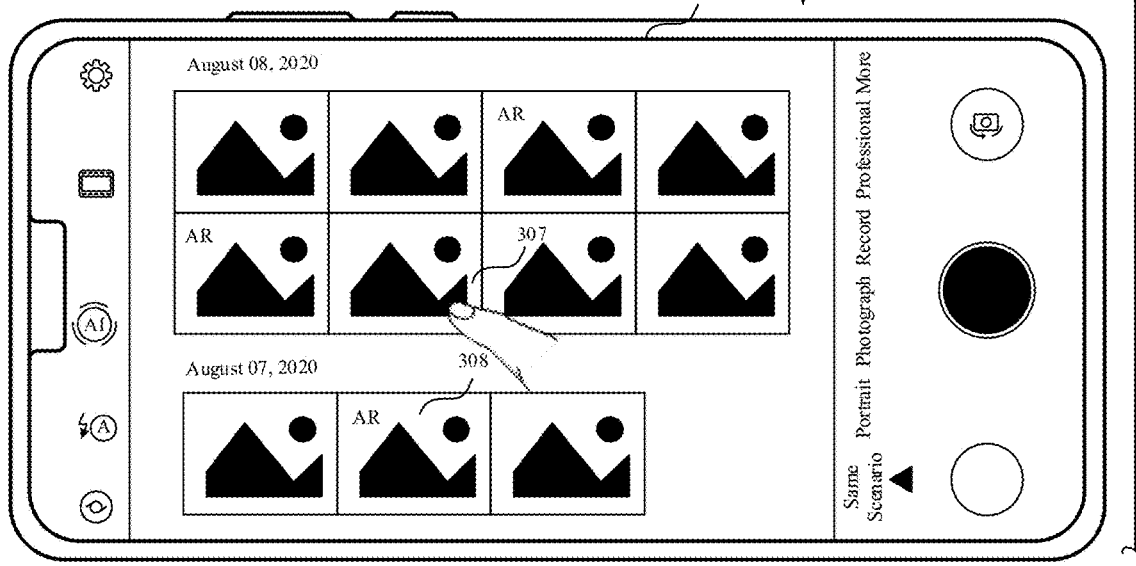

For example, in response to that the user selects the "Gallery" control 302 on the photographing interface 300 shown in FIG. 3A, the mobile phone displays an interface 306 shown in FIG. 3B. The interface 306 displays thumbnails of photos or videos in the gallery application, for example, a thumbnail of a photo 307 and a thumbnail of a photo 308. The user may select the corresponding photo or video as the target template for photographing this time.

In a technical solution 1, the mobile phone performs feature matching between a target template (which may specifically be a photo template or an image frame of a video template) and a preview currently acquired by the camera, and instructs, based on a result of feature matching, the user to move the photographing position or the attitude of the mobile phone, so that the composition of the preview acquired by the camera is the same or similar to that of the photo template or the image frame of the video template.

In a technical solution 2, the mobile phone may also obtain anchor information of the target template (including a photo template or a video template). For example, the anchor information is the position of the camera (or a photography center) when photographing the photo template or the video template. Then, the mobile phone may instruct, based on the position (or the photography center) where the current camera acquires the preview and the anchor information in the photo target template and the video target template, the user to move the photographing position of the mobile phone or the attitude of the mobile phone, so that the composition of the image acquired by the mobile phone is the same as or similar to that of the photo target template or the image frame of the video target template. In other words, when photographing by using the method, the selected target template should include corresponding anchor information. In some examples, the mobile phone may mark a photo target template or a video target template that includes anchor information, for example, marking "AR" on the photo as shown in the thumbnail of the photo 308. It should be noted that this application may adopt either of the above technical solutions or both of the above technical solutions, which is not specifically limited herein. The specific implementations of the above two technical solutions will be described in detail below.

Optionally, the mobile phone may set up a special photo album in the gallery for storing templates. In this way, after the first function of the mobile phone is enabled, the user may directly enter the photo album through the gallery control 302, and select, from the photo album, the target template to be used for photographing this time. In this way, it may be beneficial for the user to quickly select the target template. Alternatively, after the first function of the mobile phone is enabled, the user may directly enter the "Favorites" photo album in the gallery application through the gallery control 302. Generally, the "Favorites" photo album includes favorite photos or videos collected by a user, and selecting a target template from the favorite photos or videos collected by the user is also beneficial for the user to quickly select a satisfactory target template. Certainly, the user may also view a photo or video in another album and select a photo or video from the another albums as the target template.

Figure 3C:
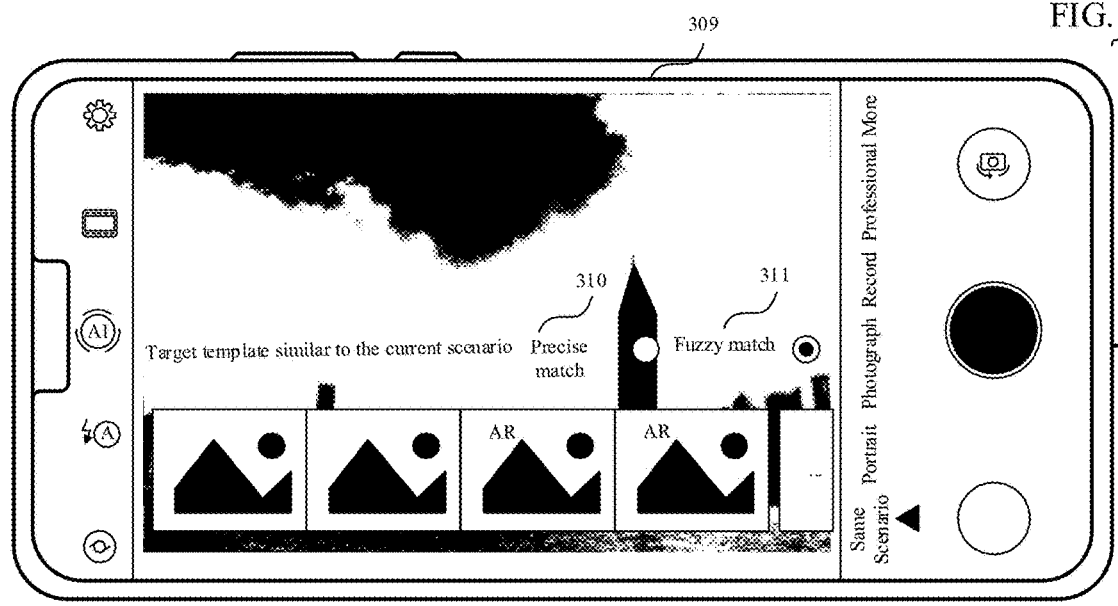

For another example, in response to that the user selects the "Smart Recommendation" control 303 on the photographing interface 300 shown in FIG. 3A, the mobile phone may display an interface 309 shown in FIG. 3C based on a preview displayed in the viewfinder frame 305, to recommend a corresponding template to the user. The interface 309 displays one or more recommended templates for the user to select a target template for photographing this time. Optionally, the interface 309 may also include a precise match control 310 and a fuzzy match control 311. That is, the user may select templates with different similarities searched through the precise match control 310 and the fuzzy match control 311, to satisfy different photographing requirements of the user. In addition, the recommended template may also include ordinary photos or videos and a photo or video including anchor information. The mobile phone marks the photo or video including the anchor information.

In a specific implementation, the mobile phone may search, based on the current position of the mobile phone (such as the GPS position) and the preview currently obtained by the camera, for templates whose positions are the same as or similar to the current position and whose similarity with the currently acquired preview is greater than a threshold A from local photos or videos, and recommend the templates to the user. Alternatively, the current positioning of the mobile phone and the preview acquired by the camera are sent to the server. The server searches for templates whose positions are the same or close to the position of the mobile phone and whose similarity with the preview is higher than the threshold A, returns the templates to the mobile phone, and recommends the templates to the user. Certainly, the mobile phone may also directly use the preview acquired by the camera to perform similarity search from a local gallery or a cloud photos album or network photos at a server. That is, the mobile phone does not need to obtain the position of the mobile phone.

In another specific implementation, the mobile phone may also perform image recognition on a preview currently obtained by the camera, identify a target object (for example, a famous landmark building, a famous scenic spot, or the like) included in the preview, and recommend a template of the target object from a local gallery or a cloud photo album or network photos at a server to the user. Certainly, the mobile phone may also directly send the preview to the server, so that the server performs image recognition and search for the corresponding template, which is not limited by this embodiment of this application. Alternatively, the mobile phone or the server may also identify a category corresponding to the preview (for example, a high-rise building, sea, desert, grassland, or the like) and recommend the template corresponding to the category to the user.

In an example, when the user selects fuzzy match, the mobile phone or the server may search based on the category corresponding to the preview, that is, search for a template having the same category as the current preview and recommend the template to the user. For example, in a case that the current preview is photographed sea, a template related to the sea is searched and recommended to the user to instruct the user to photograph a photo of the sea with reasonable composition. For example, a proportion of sea water to sky in the photo photographed by the user is the same as or close to a proportion of sea water to sky in the target template. For example, a proportion of sea water to a beach in the photo photographed by the user is the same as or close to a proportion of sea water to a beach in the target template. In this case, a geographical position of the sea of the template is probably different from that of the sea actually photographed by the user, that is, the object photographed by the user is different from that in the target template. When the user selects the precise match, the mobile phone or the server may recommend, based on a target object in the preview, the template including the target object to the user. For example, if the current preview includes a TV tower, a target including the TV tower is searched and recommended to the user, to instruct the user to photograph a photo of the TV tower with reasonable photographing composition. For example, a proportion of the tower in the entire picture of the photo photographed by the user is the same as or close to a proportion of the tower in the entire picture of the target template.

Figure 4A:
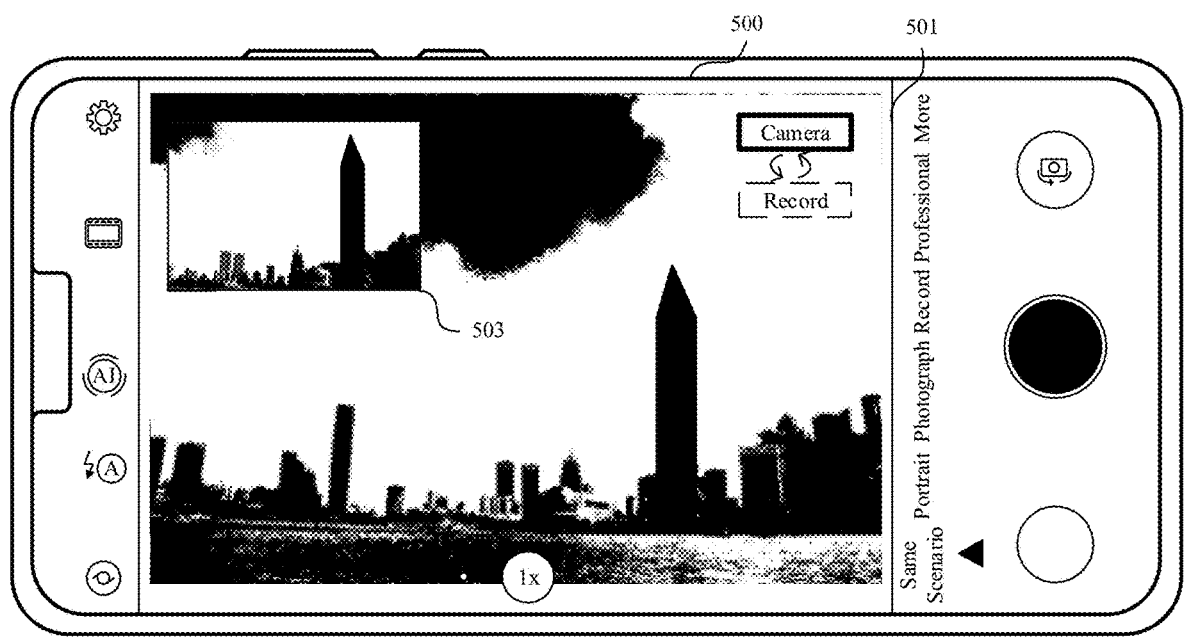
FIG. 4A to FIG. 4C are schematic diagrams of graphics user interfaces of some electronic devices according to embodiments of this application.
Figure 4B:
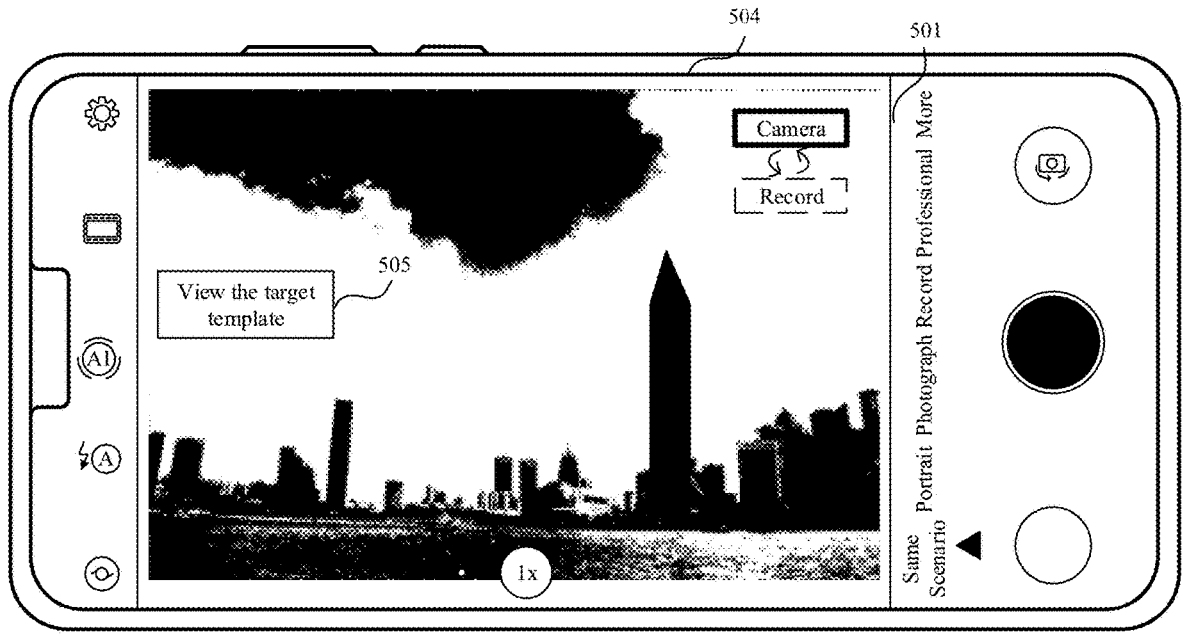
Figure 4C:
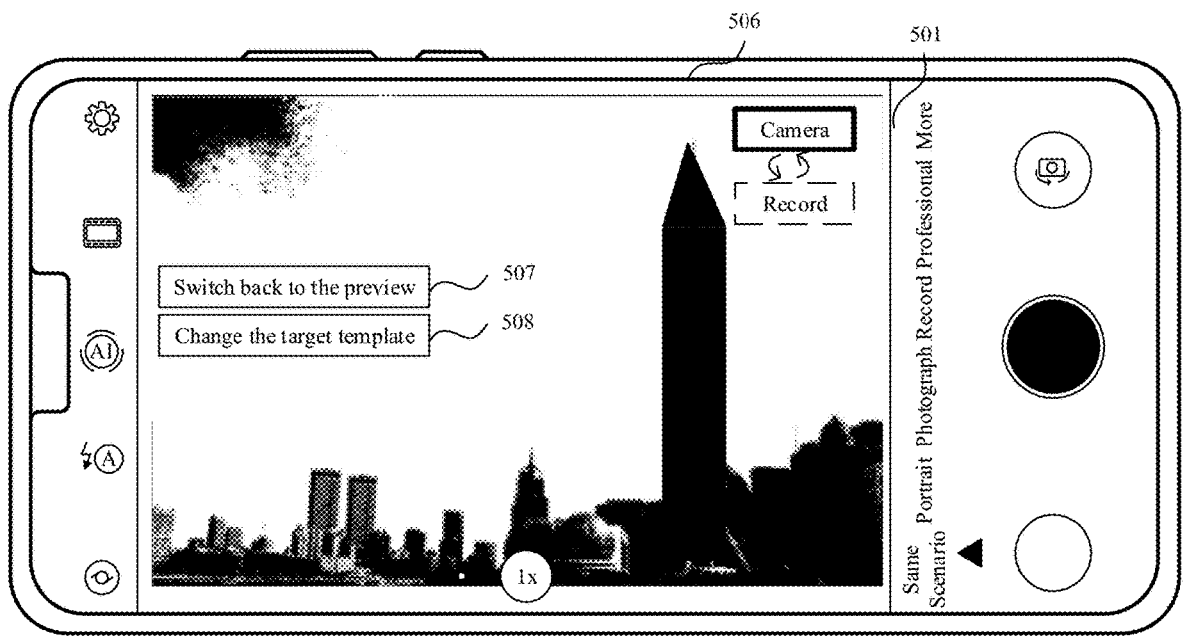

Optionally, after the user selects the target template, the mobile phone may display both the target template and the preview currently acquired by the camera, which is convenient for the user to compare. For example, as shown in FIG. 4A, on the photographing interface 500, a viewfinder frame 501 is configured to display a preview and a viewfinder frame 503 is configured to display a target template selected by a user. The viewfinder frame 501 and the viewfinder frame 503 may be partially overlapped or not overlapped, which is not limited by this embodiment of this application. For another example, on the photographing interface, the viewfinder frame 501 may display both the preview and the target template. For example, after the mobile phone transparently processes the target template by a specific transparency, the target template with a specific transparency and the preview are overlapped and displayed. That is, the user may see both the preview and the target template in the viewfinder frame 501, which is convenient for the user to adjust the photographing position and/or the attitude of the mobile phone, so that the preview and the target template coincide, that is, the composition of the preview and the target template is consistent. For another example, as shown in FIG. 4B, on a photographing interface 504, a viewfinder frame 501 is configured to display a preview. The photographing interface 504 further includes a control 505 for viewing a target template. When it is detected that the user operates the control 505 for viewing the target template, the mobile phone displays a photographing interface 506 shown in FIG. 4C. The target template is displayed in a viewfinder frame 501 in the photographing interface 506. Optionally, a control 507 for switching back to the preview and a control 508 for changing the target template are also displayed in the photographing interface 506. In other possible embodiments, the mobile phone detects an operation by the user of tapping on the control 505 for viewing the target template and displays a viewfinder frame 503 in FIG. 4A. This manner may be triggering by tapping. The target template may be triggered and displayed continuously when the mobile phone detects that the user taps the control 505 and the preview is displayed when an operation by the user of tapping on the control 507 is detected again. This manner may be triggering by touch-and-hold. The target template may also be triggered and displayed continuously when the mobile phone detects that the user touches and holds (presses on) the control 505 and then the preview is displayed when the operation by the user of lifting the finger acting on the control 507 is detected.

After the user selects the target template, the mobile phone instructs the user to adjust the photographing position or the attitude of the mobile phone based on the target template, so as to obtain a photo or a video with the same or similar composition as the target template. As introduced above, the mobile phone may adopt two different technical solutions to instruct the user to adjust the photo position or the attitude of the mobile phone. When different technical solutions are adopted, the user operations are slightly different, which are respectively introduced herein.

Figure 5:
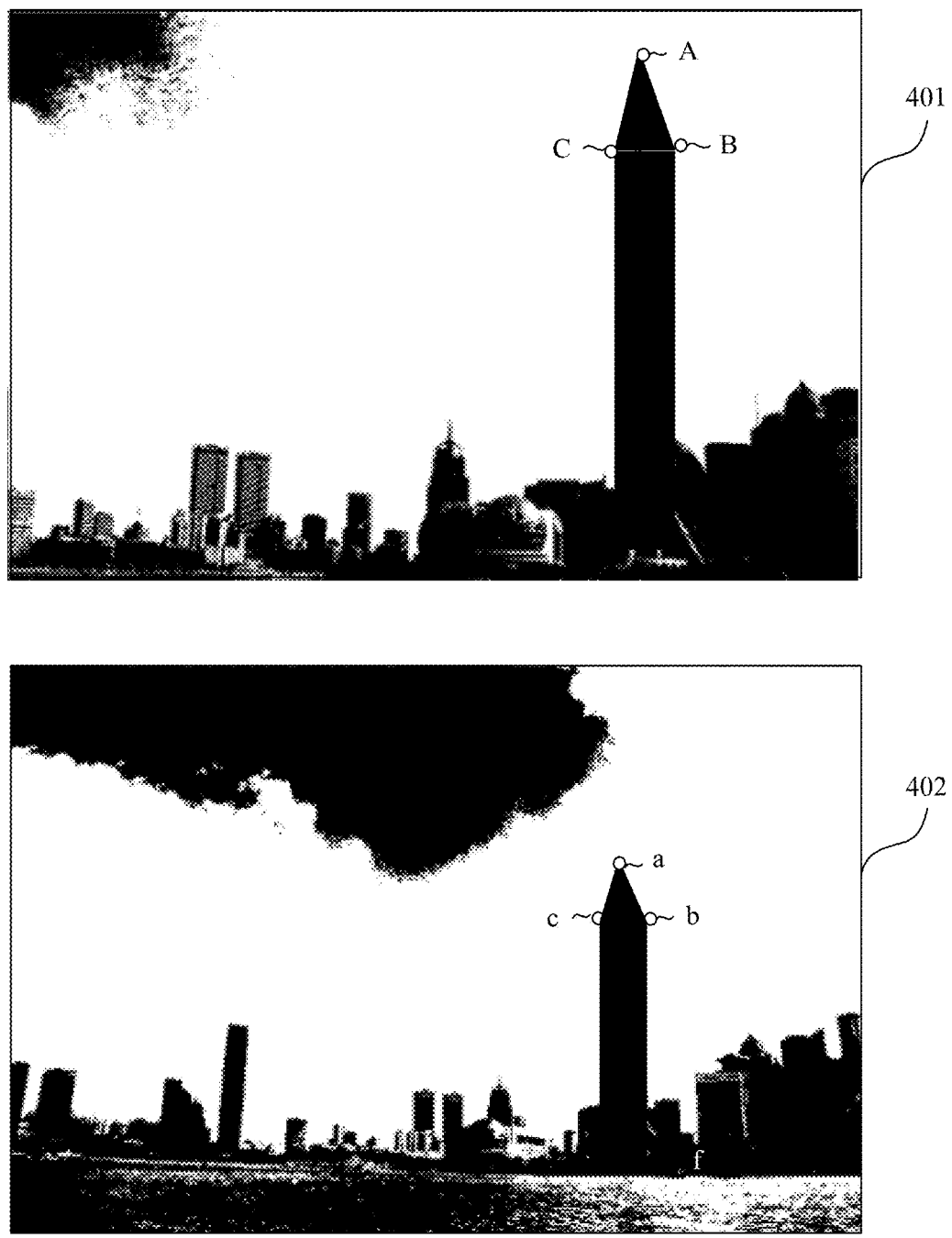
FIG. 5 is a schematic diagram of a method for feature point matching according to an embodiment of this application.

In the technical solution 1, after the user selects the target template, the mobile phone performs feature point matching on the target template and the preview acquired by the camera. The feature point matching includes feature extraction, feature description, and feature matching. Specifically, the mobile phone performs feature point detection (for example, corner detection), feature point extraction, and describes each feature point on the target template and the preview, respectively. The feature points in the target template are compared with the feature points in the preview to determine similarities. The feature matching is completed by determining whether feature points whose similarity is higher than a threshold B are a same feature point (i.e. the feature point with the same name). For example, as shown in FIG. 5, a picture 401 is a target template selected by a user and a picture 402 is a preview currently displayed by the mobile phone. The mobile phone has identified the following pairs of feature points with the same name: A and a, B and b, and C and c, or the like. It should also be noted that before performing feature point matching between the target template and the preview acquired by the camera, some preprocessing may be performed on the target template and the preview acquired by the camera to improve the accuracy of feature point matching.

In this case, pixel coordinates of $p_i$ in the target template are $(u_i, v_i)$. Pixel coordinates of feature points $P_i'$, with the same name in the preview are $(u_i', v_i')$. Then based on antipolar constraint: $(p_i)^T E P_i' = 0$, an essential matrix (essential matrix) E is calculated. Then singular value decomposition $$E = U\sum V^T = U \begin{bmatrix} a & 0 & 0 \\ 0 & b & 0 \\ 0 & 0 & c \end{bmatrix} V^T$$

is used, where U and V both are orthogonal matrices.

Further, because $E = R[t]_x$, where R is an orthogonal matrix and $[t]_x$ is an antisymmetric matrix. Therefore, a rotation matrix R and translation matrix $[t]_x$ may be calculated based on the result of singular value decomposition.

It may be understood that the mobile phone may match the feature points in the target template and the preview using any technique known in the related art, which is not limited by this embodiment of this application. For example, the mobile phone may use a Harris corner detection method. For example, the mobile phone may use a feature extraction method such as scale-invariant feature transform (scale-invariant feature transform, SIFT) or an ORB. For example, the mobile phone may perform feature description by using a feature description operator such as speeded up robust features (speeded up robust features, SIFT). For example, the mobile phone may perform feature matching by using a RANSAC matching method, a least square method, or the like.

Figure 6A:
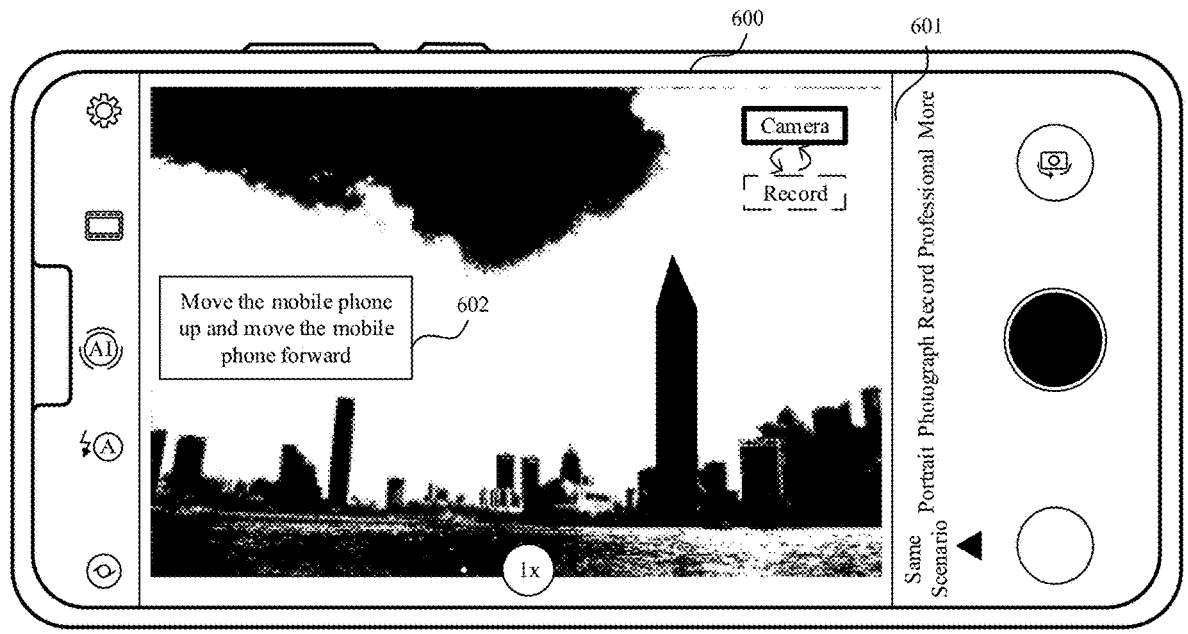
FIG. 6A and FIG. 6B are schematic diagrams of graphics user interfaces of some electronic devices according to embodiments of this application.
Figure 6B:
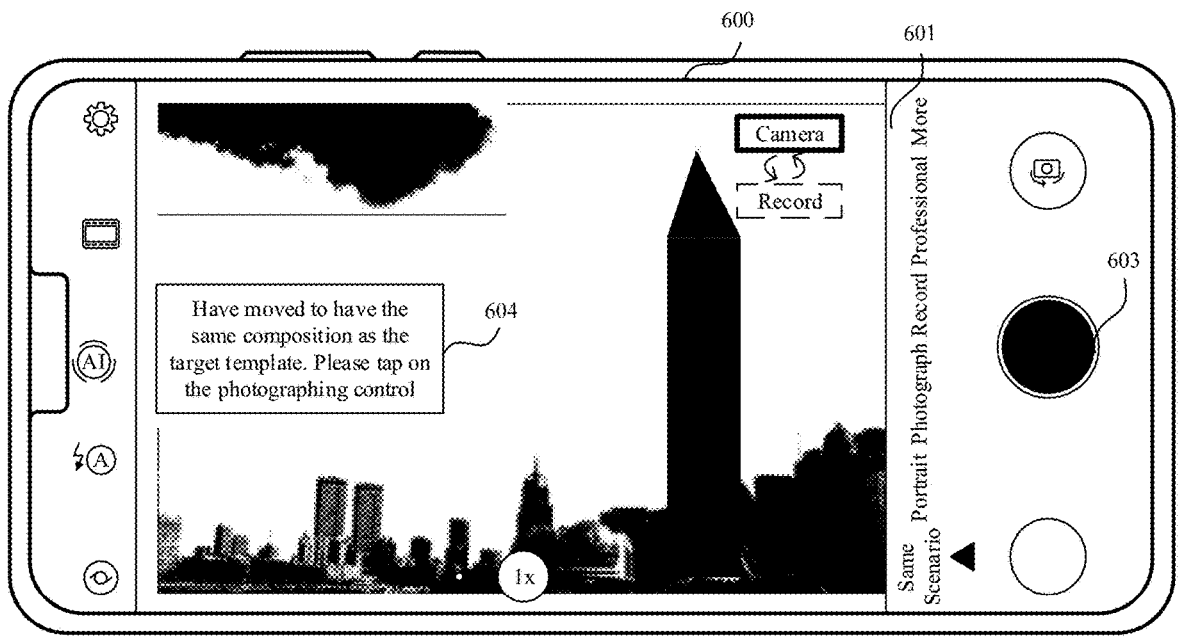

Then, the mobile phone may display, based on the calculated rotation matrix R and the translation matrix[t], corresponding instruction information to instruct the user to move the mobile phone. In an example, the mobile phone may instruct the user to move the photographing position back and forth (or adjust the photographing magnification) based on the relative size of the same scene in the preview and the target template, then move the photographing position left and right, and finally adjust the attitude of the mobile phone. Certainly, the user may also be instructed to adjust the photographing position and/or the attitude of the mobile phone in other sequences. For example, as shown in FIG. 6A, the mobile phone prompts, based on the rotation matrix R and the translation matrix $[t]_x$, the user to move the mobile phone, for example, displaying prompt information 602: "Move the mobile phone up and move the mobile phone forward". When the composition of the preview displayed in the viewfinder frame 601 is the same as or similar to that of the target template, as shown in FIG. 6B, the mobile phone may also display prompt information 604, to prompt the user to start photographing. In this case, the user may tap on the photographing control 603 to complete photographing this time. It should be noted that the mobile phone may prompt the user in any way such as text prompt, pattern prompt (for example, an arrow, a coordinate system, or the like), animation prompt, voice prompt, and the like. This embodiment of this application does not limit the specific prompt mode.

If the user executes the recording function this time, the mobile phone performs feature matching based on a first frame picture of the video template and the preview currently displayed by the mobile phone, and calculates the rotation matrix R and the translation matrix $[t]_x$, to prompt the user to move the mobile phone. When the composition of the preview displayed in the viewfinder frame 601 is the same as or similar to that of the video template, the mobile phone prompts the user to start recording. Then, in some possible embodiments, the mobile phone performs feature matching based on each frame image in the video template and the image displayed in real time in the viewfinder frame, and calculates the rotation matrix R and the translation matrix $[t]_x$, to prompt the user to move the mobile phone. In this way, each frame image in the video recorded by the user has similar composition to each frame image in the video template. In other possible embodiments, the mobile phone processes the video template in advance, extracts a frame for the video (for example, extracts one frame every five frames), performs feature matching based on each frame image in the extracted video template and the real-time displayed image in the viewfinder frame, and calculates the rotation matrix R and the translation matrix $[t]_x$, to prompt the user to move the mobile phone. In other words, total duration of the video photographed by the mobile phone and the video of the target template may be the same or different.

In some other examples, if the user selects a photo template for recording, the user may be prompted to move the mobile phone based on the photo template and the preview, so that a first frame image of the recorded video has the same or similar composition as the photo template. Other frame images of the video recorded by the user are not limited.

Figure 7A:
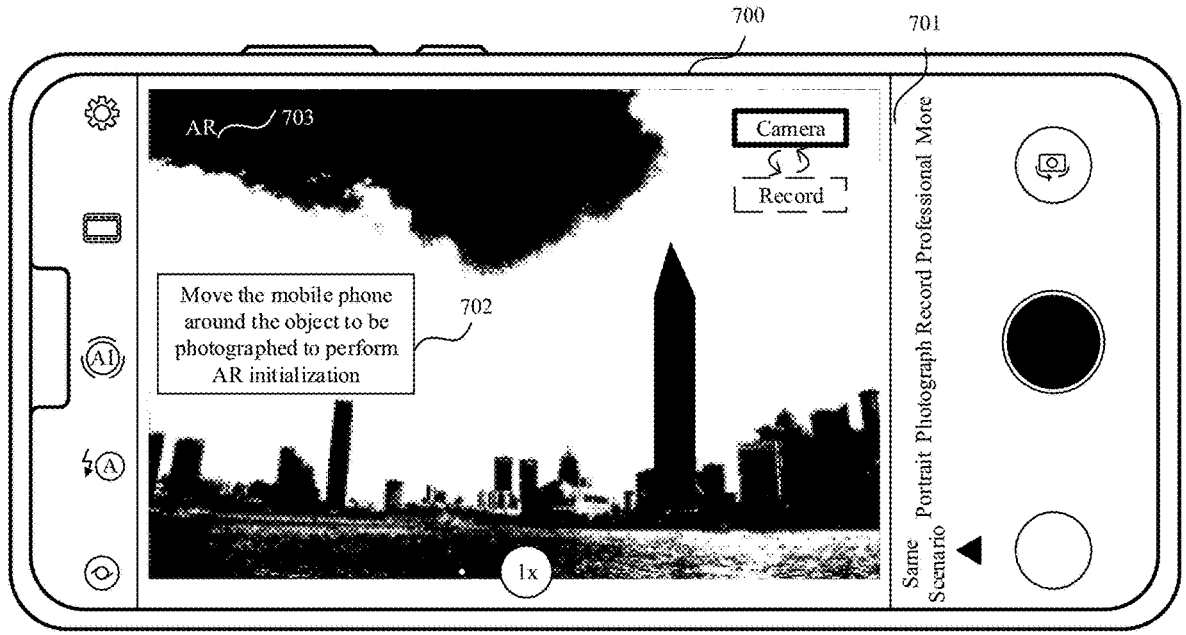
FIG. 7A to FIG. 7C are schematic diagrams of graphics user interfaces of some electronic devices according to embodiments of this application.
Figure 7B:
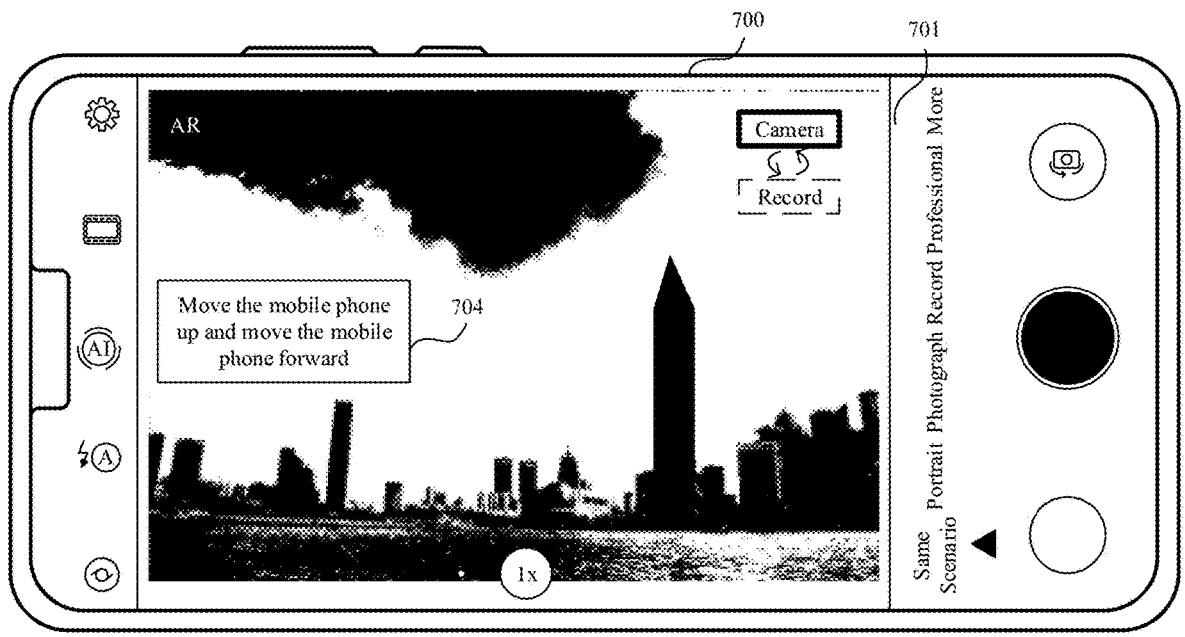
Figure 7C:
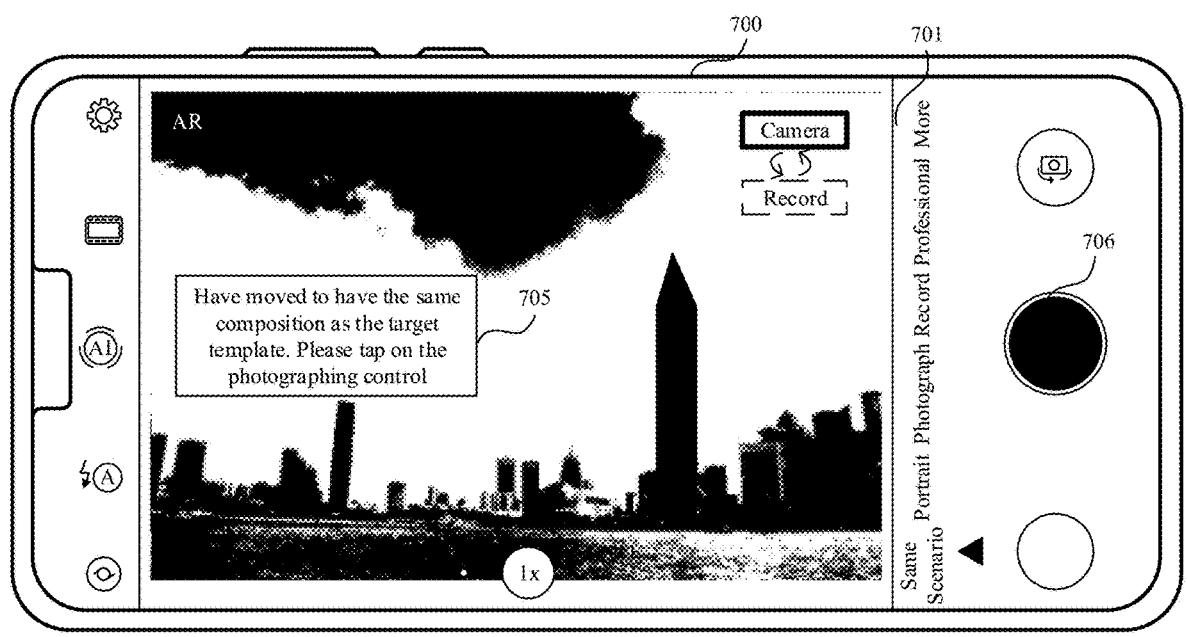

In the technical solution 2, after the user selects the target template with anchor information, the mobile phone displays an interface 700 shown in FIG. 7A, including prompt information 702, to prompt the user to first move or rotate the mobile phone around the object to be photographed and scan the environment where the object to be photographed is located, that is, perform AR initialization. Optionally, the photographing interface 700 may display a mark 703, so that it is convenient for a user to learn about a current AR-based technical solution. In this case, the mobile phone calculates a current position of the camera (or the photography center) by using a plurality of images acquired by the camera based on an AR repositioning technology. Then, a moving direction and distance and the direction and angle of rotating the mobile phone are calculated based on the anchor information corresponding to the target template and the current position of the camera. As shown in FIG. 7B, prompt information 704 is displayed, to instruct the user to move or rotate the mobile phone. Certainly, the other modes such as voice and animation may also be used to prompt the user. For example, the mobile phone may display, in the viewfinder frame 701, AR navigation (including the direction, the distance, and the like) in a superimposing manner, to instruct the user to reach the position where the target template is photographed. When the composition of the preview in the viewfinder frame 701 is the same as or similar to that of the target template, as shown in FIG. 7C, the mobile phone displays prompt information 705, to prompt the user to start photographing.

If the user executes the recording function this time, there are at least two pieces of anchor information in the selected video template. Then, when the user records the video, the user is prompted, based on at least two pieces of anchor information in the video template, to move or rotate the mobile phone, so that the composition of each frame image in the video recorded by the user is the same or similar to that of each frame image in the video template. In some possible embodiments, at least two pieces of anchor information mean that the first frame of the video and the last frame of the video have anchor information, to prompt the user to move from an initial photographing position and/or attitude to a final photographing position and/or attitude. In some other possible embodiments, at least two pieces of anchor information mean that each frame of the video includes anchor information.

Figure 8A:
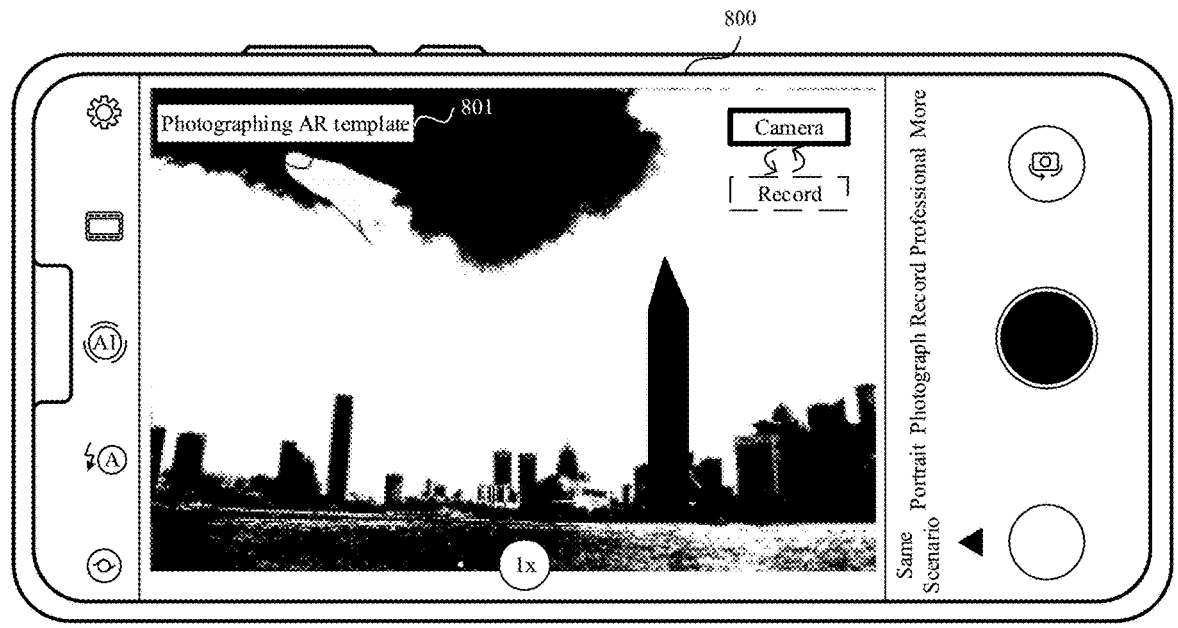
FIG. 8A and FIG. 8B are schematic diagrams of graphics user interfaces of some electronic devices according to embodiments of this application.
Figure 8B:
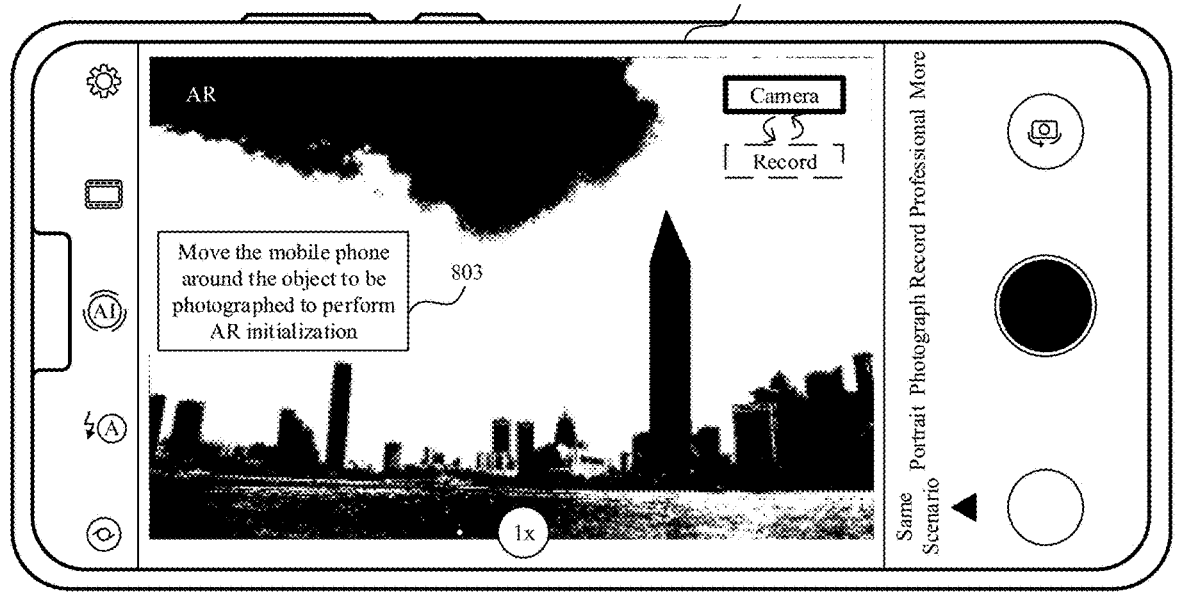

In some other examples, the mobile phone may also photograph a template (including a photo template or a video template) carrying anchor information. For example, a photographing AR template control 801 is included in a photographing interface 800 shown in FIG. 8A. In response to detecting that the user operates the photographing AR template control 801, the mobile phone displays an interface 802 shown in FIG. 8B, in which the prompt information 803 is used to prompt the user to first move or rotate the mobile phone around the object to be photographed and scan the environment where the photographed object is located, that is, perform AR initialization. In this case, the mobile phone calculates a current position of the camera (or the photography center) by using a plurality of images acquired by the camera based on an AR repositioning technology, and constructs a map. Then, the user may move the mobile phone to photograph the object to be photographed. In this case, the mobile phone determines the anchor information corresponding to the photo, that is, the position of the camera when photographing the photo, based on the photographed photo and the constructed map. The photo may be used as a photo template. The mobile phone may save the photo (and information contained in the photo) locally or upload the photo (and the information contained in the photo) to the server. Optionally, the mobile phone/server may mark the photo to distinguish photo templates that do not have anchor information.

Certainly, if a video template is recorded by a user, corresponding anchor information is determined for each frame image in the video template. The other operations are the same as the photo template for photographing, which is not repeated again herein.

The foregoing embodiments have been explained by taking the object to be photographed as a scene as an example. In some scenarios, the object to be photographed also includes a character or an animal and the like, and the character or animal is desired to be located at an appropriate position in a photo or video picture. For example, the position is the same as or similar to that of the character or animal in the target template.

In some embodiments, when a scene and a character are included in the target template, the scene and the character may be separated based on portrait matting of a neural network model. Then, aiming at the scene, the foregoing methods (feature matching or AR repositioning technology) are used, to instruct the user to move the position, so that the scene in the preview of the mobile phone and the scene in the target template have the same or similar composition. Then, based on the portrait of the target template, the user is instructed to notify a character to be photographed to move the position, so that the position of the character in the preview of the mobile phone in the entire preview is consistent with the position of the character in the target template in the entire target template and/or the attitude of the character in the preview is consistent with that of the character in the target template. In other words, the user is instructed, based on the composition of the scene in the target template, to adjust the position of the mobile phone and the attitude of the mobile phone, and then the object to be photographed (that is, a character to be photographed) is instructed, based on a standing position (a position in the image) and/or pose of the character in the target template, to move the position and/or adjust the pose. Certainly, in some other embodiments, when a user does not need to photograph an image having consistent scene composition with the target template, but needs to photograph an image in which a character has the same standing position and/or pose as in the target template, the mobile phone may directly instruct, based on the standing position and/or pose of the character in the target template, the object to be photographed to move the position and/or adjust the pose.

Figure 9A:
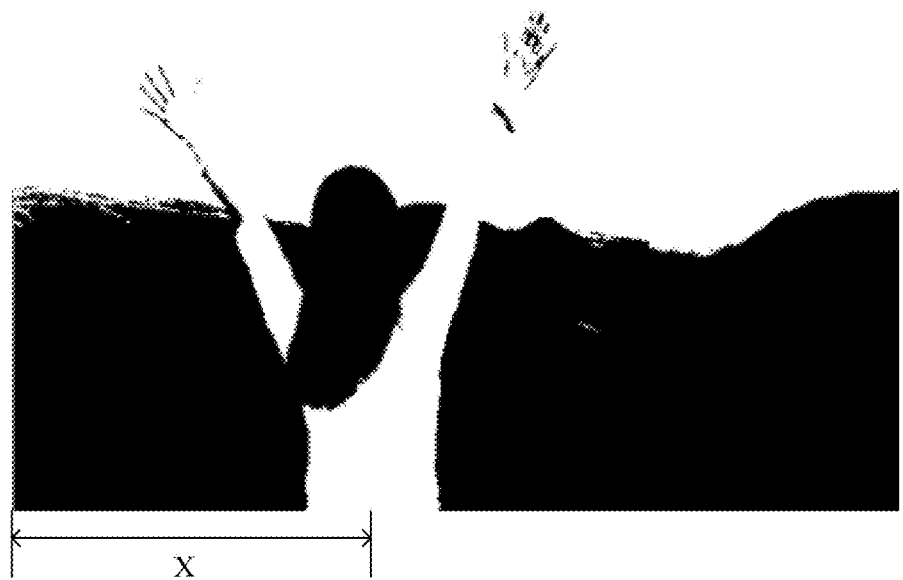
FIG. 9A to FIG. 9C are schematic diagrams of graphics user interfaces of some electronic devices according to embodiments of this application.
Figure 9B:
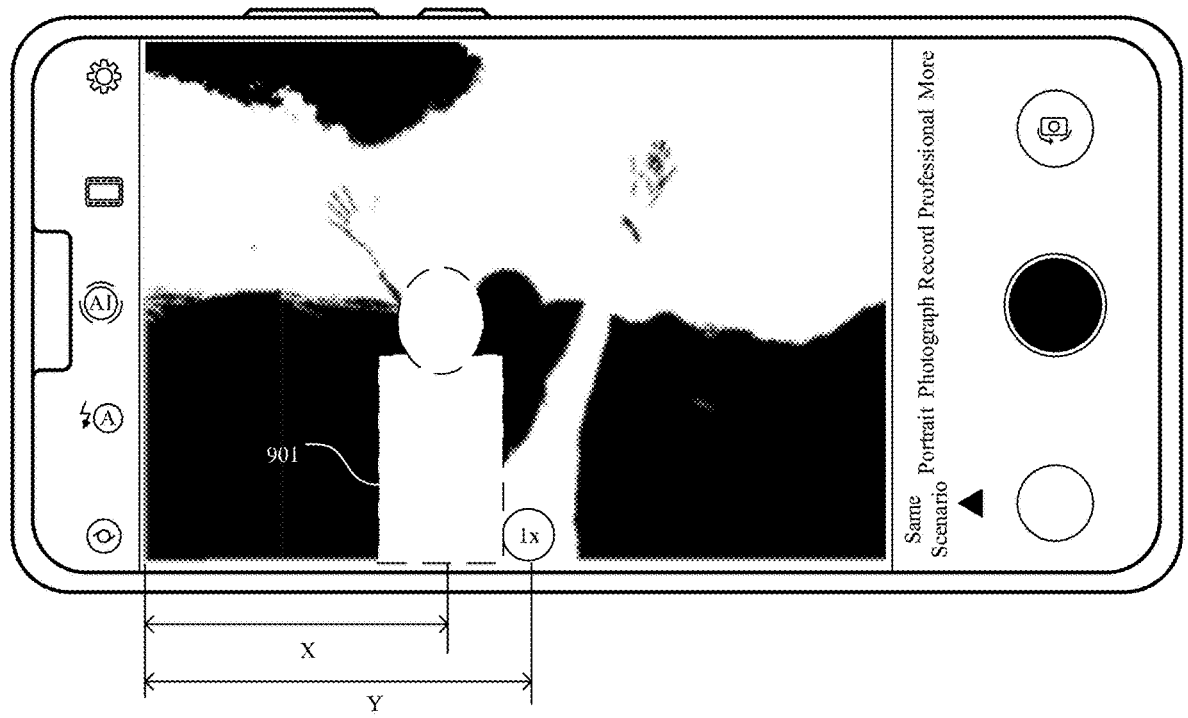
Figure 9C:
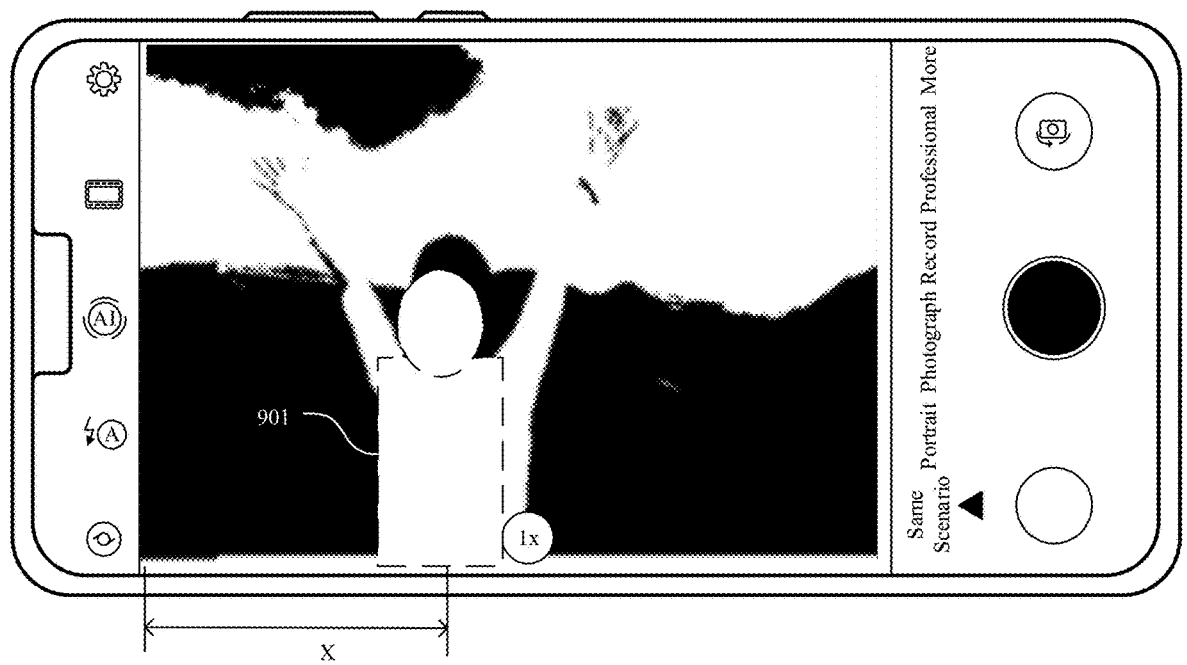

As shown in FIG. 9A, the target template is selected by the user. In the target template, the distance between the character and a left edge of the entire image is X. As shown in FIG. 9B, when a distance from the character in the preview displayed in the mobile phone to the left edge of the entire preview is Y, where Y is not equal to X, the mobile phone may play a prompt voice or display prompt information, to instruct the object to be photographed to move in a specific direction (for example, to the left). Optionally, the mobile phone may display a character box 901 at a corresponding position in the preview based on the position of the character in the target template in the entire image, to prompt the user where the object to be photographed is expected to be located. When the object to be photographed is located in the character box 901, the user is prompted that a photo can be photographed. As shown in FIG. 9C, when an outline of the character in the preview displayed in the mobile phone is larger or smaller than the character box 901, the object to be photographed may also be instructed to move in a direction away from or close to the mobile phone.

Certainly, a proportion of a character area in the preview to an area of the entire preview is consistent with a proportion of a character area in a target template to an area of the entire target template. In this case, the position of the character in the preview in the entire preview may not be required to coincide with the position of the character in the target template in the entire target template.

In addition, the mobile phone may also recognize the pose of the portrait in the target template. Specifically, the method of detecting key points (such as bone points) of a human body (such as running a network model such as OpenPose) is used to extract key points of a character in the target template, these key points are fitted with some models to implement a virtual character (for example, a portrait skeleton or a virtual character model constructed based on the portrait skeleton), and the virtual character is displayed in the preview. The virtual character may instruct the object to be photographed to make the same pose as the character in the target template. In some examples, the object to be photographed is far away from the position of the mobile phone of the user. The user may also send the instruction information to the electronic device of the object to be photographed, so that the object to be photographed makes the same pose according to the instruction information, thereby implementing cooperative photographing by the photographer and the object to be photographed. For example, the user may send one or more of the instruction information of the current mobile phone, the preview, the picture template, the virtual character, and other information to the electronic device of the object to be photographed, and the object to be photographed may adjust the position and/or pose based on the received one or more of the foregoing information. The implementation process may be triggered based on active sharing by a user, and may also be triggered through code scanning by a user or triggered using an NFC module by a user.

In some other embodiments, when the target template includes a plurality of characters, the corresponding positions of the characters may be recommended based on the similarity between the body shapes of the plurality of characters in the preview of the mobile phone and the plurality of characters in the target template. Alternatively, when a plurality of characters in the target template and a plurality of characters in the preview are the same characters, the mobile phone may also perform face recognition on the characters in the target template to identify different individuals. Then, the face recognition is also performed on the characters in the preview, and each character is instructed to adjust the position and strike the same pose based on the position and/or pose of the characters in the target template. Alternatively, the mobile phone may also instruct the objects to be photographed to adjust the positions and poses based on a front and back relationship of standing positions of the characters in the target template (that is, the distances from the mobile phone during photographing) and a front and back relationship of the standing positions of the characters in the current preview. The front and back relationship of the standing positions of the characters may be determined based on an occlusion relationship of the plurality of characters in the target template. Alternatively, the front and back relationship of the standing positions of the characters may be determined based on positions of feet of the plurality of characters in the target template. For example, the object to be photographed standing in front is instructed to strike the same or similar pose as the character standing in front of the target template.

Figure 10:
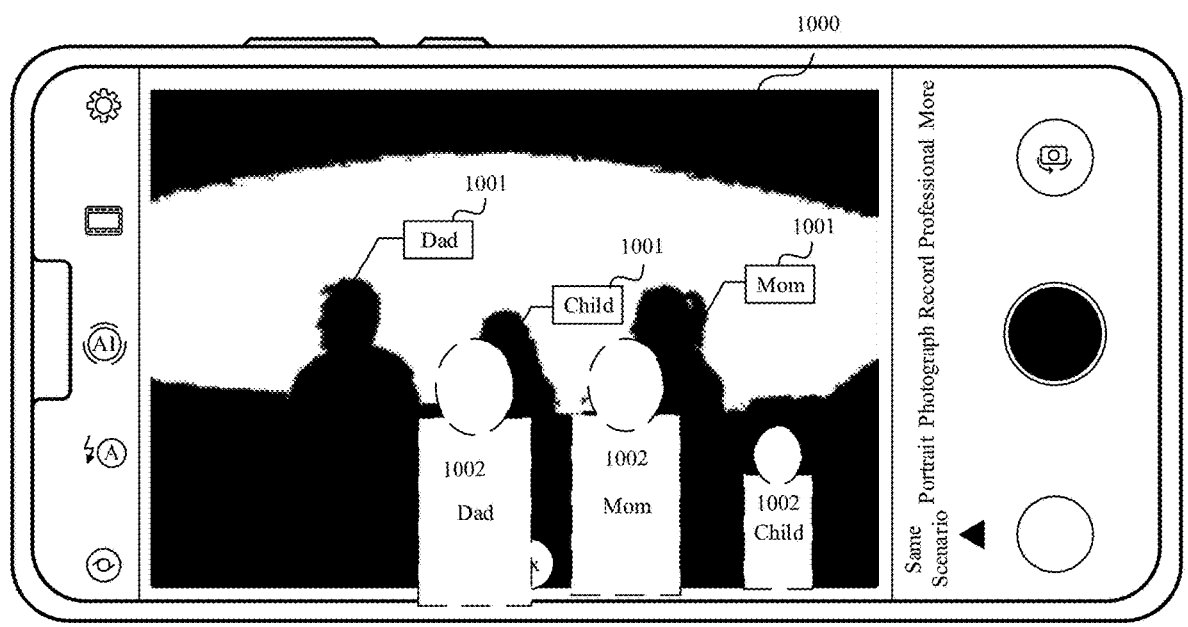
FIG. 10 is a schematic diagram of a graphics user interface of another electronic device according to an embodiment of this application.

For example, parents and a child want to photograph photos with the same composition in the same place at different times. The photos photographed by the parents and child may be used as the target template, and then based on the template, the composition of scene in the preview in the mobile phone at this time is first enabled to be the same as that of the scene in the target template. Then, based on the recognized positions and/or poses of the parents and child, the parents and child are instructed to adjust positions based on the relative positions and/or poses in the target template. The specific instructing method may refer to the processing of a single character, which is not repeated herein. For example, for a photographing interface 1000 shown in FIG. 10, the photographing interface 1000 displays marks 1001 for characters in the preview and determines character boxes 1002 based on the characters in the target template. The user may instruct the parents and child to adjust their relative positions and strike the same poses as the characters in the target template based on the task boxes required by the characters.

For another example, when a user records a long video, the user may need to interrupt and rest in the middle of recording. The user may use the last frame image of the photographed video as the target template. When recording of the video is started again, by using the method according to this embodiment of this application, framing composition of a first frame image of the video that is started again is kept consistent that of the target template, that is, the consistency in the framing composition includes consistency in the composition of the scene and the character. In this way, when the videos photographed twice are merged together, obvious frame skipping and inconsistent pictures are avoided.

In some other embodiments, the mobile phone may also consider another character, plus which a quantity of characters in the preview exceeds a quantity of characters included in the target template, as a passerby, and may execute a passerby elimination algorithm, thereby obtaining a photo including only the characters that the user wants to photograph and improving the photographing experience.

In some other embodiments, the mobile phone may also accept an operation by a user of tapping on a character in a preview interface, so as to instruct the designated character to adjust the attitude, thereby avoiding the interference caused by a passerby when there are many individuals.

In still some other embodiments, in addition to instructing a user to photograph a photo or video that is the same or similar to the target template based on the framing composition of the target template (including the composition of a landscape and a character), the mobile phone may also recommend some photographing parameters to the user based on the target template or use the photographing parameters saved by the target template to photograph a photo or record a video by default. The photographing parameters include, for example, image processing parameters such as photographing mode parameters (such as a portrait mode or a panoramic mode), filter parameters, or beauty parameters. In this way, it is convenient for the user to quickly photograph a photo or video with the same visual effect as the target template. It can be understood that, compared with a photo photographed using a camera based on an old photograph, optionally, a photo photographed using a camera based on an actual scene/character has more parameters.

In some possible embodiments, this embodiment of this application further provides a server. The server includes one or more processor, a memory, and a communications module.

The server receives a picture and/or a video sent by an electronic device. Specifically, the server may be used by users to register accounts and upload template photos/template videos. The server optionally classifies and stores the photos uploaded by the users. For example, the server performs classification based on GPS position information or anchor information carried in the photos or the videos and stores the photos or the videos in categories. For another example, the server performs searching based on content of the photos or the videos, to identify prominent buildings/scenes in the photos or the videos, and stores the photos or the videos in categories. For another example, the server identifies based on content of the picture or the video, analyzes composition of the picture or the video, and performs classification based on rule-of-thirds composition, equal ratio composition, mirror image composition, or the like. For another example, the server performs identification based on content of the pictures or the videos, analyzes scenarios of the pictures or the videos, and classifies the pictures or the videos based on scenarios such as beaches, coastlines, buildings, and portraits.

The server receives a request for obtaining a template photo or a template video sent by an electronic device. For example, the request carries GPS position information or anchor information, and the server optionally selects a similar photo or video from the memory based on the GPS position information or the anchor information and returns the photo or the video to the electronic device. For another example, when the request carries a picture, the server optionally analyzes the picture, selects one or more dimension from a plurality of dimensions described above, selects an appropriate photo, and returns the picture to the electronic device. Optionally, the server returns a photo to the electronic device. Alternatively, the server returns a plurality of photos to the electronic device for the user to select.

The server receives scores sent by the electronic device and sorts priorities of the template pictures or videos. The user optionally scores a photo template or a video template after using the photo template or the video template. The electronic device may send the user's score to the server. After receiving the scores, the server sorts the stored photo templates or picture templates based on the scores, so as to perform recommendation based on different priorities according to the scores when recommending a photo template or a picture template to a user.

Figure 11:
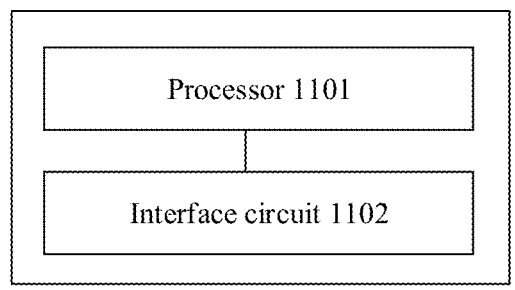
FIG. 11 is a schematic structural diagram of a chip system according to an embodiment of this application.

An embodiment of this application further provides a chip system. As shown in FIG. 11, the chip system includes at least one processor 1101 and at least one interface circuit 1102. The processor 1101 and the interface circuit 1102 may be interconnected through a circuit. For example, the interface circuit 1102 may be configured to receive a signal from another apparatus (for example, a memory of an electronic device 100). For another example, the interface circuit 1102 may be configured to send a signal to another apparatus (for example, processor 1101). For example, the interface circuit 1102 may read instructions stored in a memory and send the instructions to the processor 1101. When the instructions are executed by the processor 1101 the electronic device may be caused to perform the steps performed by the electronic device 100 (for example, a mobile phone) in the foregoing embodiments. Certainly, the chip system may also include other discrete devices, which are not specifically limited by this embodiment of this application.

An embodiment of this application further provides an apparatus, which is included in an electronic device and has functions of implementing behaviors of the electronic device in any of the methods in the foregoing embodiments. The function can be implemented by hardware, and can also be implemented by hardware executing corresponding software. The hardware or the software includes at least one module or unit corresponding to the foregoing function, for example, a detection module or unit, a display module or unit, a determining module or unit, a calculating module or unit, and the like An embodiment of this application further provides a computer-readable storage medium, including computer instructions, where the computer instructions, when run on an electronic device, cause the electronic device to perform any of the methods in the foregoing embodiments.

An embodiment of this application further provides a computer program product, where the computer program product, when run on a computer, causes the computer to perform any of the methods in the foregoing embodiments.

An embodiment of this application further provides a graphics user interface on an electronic device. The electronic device is provided with a display, a camera, a memory, and one or more processors. The one or more processors are configured to execute one or more computer programs stored in the memory, and the graphics user interface includes a graphics user interface displayed when the electronic device performs any of the methods in the foregoing embodiments.

It can be understood that, to implement the functions, the terminal includes a corresponding hardware structure and/or software module for executing the various functions. A person skilled in the art may be easily aware that, in combination with the units and algorithm steps in the examples described in the embodiments disclosed in this specification, the embodiments of this application may be implemented by hardware or a combination of hardware and computer software. Whether a function is performed by hardware or computer software driving hardware depends on particular applications and design constraint conditions of the technical solutions. A person skilled in the art may use different methods to implement the described functions for each particular application, but it should not be considered that the implementation goes beyond the scope of the embodiments of the present invention.

In the embodiments of this application, division of functional modules of the terminal or the like may be performed according to the method embodiment. For example, each functional module may be divided corresponding to each function, and two or more functions may alternatively be integrated to one processing module. The integrated module may be implemented in a form of hardware, or may be implemented in a form of a software functional module. It should be noted that the division of the modules in the embodiments of the present invention is schematic and is merely logical function division, and there can be other division modes in actual implementation.

With the above description of embodiments, as will be clearly understood by a person skilled in the art, only the division of the above functional modules is given as an example for the convenience and conciseness of description. In practical application, the above functional distribution can be completed by different functional modules according to needs, that is, the internal structure of the apparatus is divided into different functional modules to complete all or part of the functions described above. For a detailed working process of the foregoing system, apparatus, and unit, reference may be made to a corresponding process in the foregoing method embodiments, and details are not described herein again.

In the functional units in the embodiments of this application may be integrated into one processing unit or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in a form of a software product. The computer software product is stored in a storage medium and includes instructions for instructing a computer device (which may be a personal computer, a server, a network device, or the like) or processor to perform all or some of the steps of the methods described in the embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out within the technical scope disclosed in this application shall fall within the protection scope of this application. Therefore, the protection scope of this application shall be subject to the protection scope of the claims.

What is claimed is:

1. A photographing method, comprising:
    starting a camera application and displaying a first interface, wherein the first interface comprises a first control for enabling a first function;
    displaying a second interface in response to a first user operation acting on the first control, wherein the second interface comprises a second control and the second control is used for selecting a target template;
    displaying a third interface in response to a second user operation of selecting the target template, wherein the third interface comprises a first preview;
    displaying first prompt information, for prompting a user to move an electronic device or rotate the electronic device;
    acquiring, by the electronic device, a plurality of first images in a process in which the user moves the electronic device or rotates the electronic device;
    calculating a current position and an attitude of the electronic device based at least on the plurality of first images and the first preview;
    calculating one or more of, a moving direction, a moving distance, an attitude rotation direction, or a rotation angle of the electronic device, based on the current position and the attitude of the electronic device and anchor information of the target template; and
    displaying instruction information instructing the user to move the current position of the electronic device or the attitude of the electronic device based on the moving direction, the moving distance, the attitude rotation direction, or the rotation angle of the electronic device; and
    displaying a fourth interface, wherein the fourth interface comprises a second preview and composition of the second preview is the same as that of the target template.

2. The method according to claim 1, wherein when the target template comprises a character, the instruction information is further used for instructing a character to be photographed to move a position or adjust a pose.

3. The method according to claim 2, wherein the composition of the second preview is the same as that of the target template comprises at least one of the following:
    the second preview and the target template each comprise a first object, and a position of the first object in the second preview is the same as a position of the first object in the target template;
    the second preview and the target template each comprise a first type of object, and a position of the first type of object in the second preview is the same as a position of the first type of object in the target template; and
    the second preview and the target template each comprise a character, and a position or a pose of the character in the second preview is the same as a position or a pose of the character in the target template, respectively, wherein the character in the second preview and the character in the target template are a same person or different persons.

4. The method according to claim 1, wherein before displaying instruction information, the method further comprises:
    performing feature point matching on the target template and the first preview, and calculating a moving direction and a moving distance of the electronic device or calculating an attitude rotation direction and a rotation angle of the electronic device based on corresponding positions of feature points with a same name in the target template and the first preview.

5. The method according to claim 1, wherein calculating one ore more of: the moving direction, the moving distance, the attitude rotation direction, or the rotation angle of the electronic device, comprises:
    calculating the current position and the attitude of the electronic deice based on the plurality of first images and the first preview and implementing augmented reality (AR) repositioning technology; and
    calculating the moving direction and the moving distance of the electronic device or calculating the attitude rotation direction and the rotation angle of the electronic device based on the current position and attitude of the electronic device and anchor information of the target template.

6. The method according to claim 1, further comprising:
    displaying a fifth interface, wherein the fifth interface displays a third control for indicating to photograph the target template;
    displaying, in response to detecting a third user operation acting on the third control, second prompt information, for prompting the user to move the electronic device or rotate the electronic device;
    acquiring a plurality of second images in the process in which the user moves the electronic device or rotates the electronic device and determining a map based on the plurality of second images;
    photographing a third image in response to detecting a fourth user operation for indicating photographing; and
    determining anchor information of the third image based on the map and the third image, wherein the anchor information of the third image comprises a position and an attitude of the electronic device when photographing the third image, and the map.

7. The method according to claim 1, wherein after the displaying a fourth interface, wherein the fourth interface comprises a second preview, the method further comprises:
photographing a first photo or recording a first video in response to detecting a fifth user operation for indicating photographing, wherein
when the target template is a photo, composition of the first photo is the same as that of the target template, and composition of a first flame image in the first video is the same as that of the target template; or
when the target template is a video, composition of at least one frame image in the first video is the same as that of at least one frame image in the target template.

8. The method according to claim 7, wherein that when the target template is a video, composition of at least one frame image in the first video is the same as that of at least one frame image in the target template specifically comprises:
when the target template is a video, composition of each frame image in the first video is the same as that of each frame image in the target template; or, composition of a first frame image and a last frame image in the first video is the same as that of a first frame image and a last frame image in the target template, respectively; or, composition of at least two frame images in the first video is the same as that of at least two frame images in the target template.

9. The method according to claim 1, wherein the displaying instruction information, wherein the instruction information is used for instructing a user to move a position of an electronic device or an attitude of the electronic device specifically comprises:
displaying, in the first preview, an arrow or augmented reality (AR) navigation or animation, for instructing the user to move the position of the electronic device the attitude of the electronic device.

10. The method according to claim 1, further comprising:
sending one or more of the instruction information, a preview acquired by the electronic device, and the target template to another electronic device, for instructing a character to be photographed to move a position or adjust a pose.

11. The method according to claim 1, wherein the second user operation of selecting the target template comprises: an operation of selecting the target template from photos or videos stored locally by the electronic device; or an operation of selecting the target template from photos or videos pushed by a server.

12. The method according to claim 1, wherein a photographing position of the electronic device comprises a distance between the electronic device and a photographed object and a height of the electronic device from ground; or, the photographing position of the electronic device comprises a current GPS position of the electronic device.

13. The method according to claim 1, wherein the starting a camera application and displaying a first interface, wherein the first interface comprises a first control for enabling a first function comprises: after starting the camera application, displaying a third preview acquired by the electronic device; and
when similarity between the third preview and a photo or an image frame of a video in a gallery of the electronic device is greater than a first threshold, displaying the first interface, wherein the first interface comprises the first control for enabling the first function.

14. The method according to claim 1, wherein the starting a camera application and displaying a first interface, wherein the first interface comprises a first control for enabling a first function comprises:
after starting the camera application, photographing a second photo or recording a second video in response to a sixth user operation for indicating photographing; and
when similarity between the second photo or an image frame of the second video and a photo or an image frame of a video in a gallery of the electronic device is greater than a second threshold, displaying the first interface, wherein the first interface comprises the first control for enabling the first function.

15. The method according to claim 1, wherein a photo or a video in a gallery of the electronic device has position information; and
the starting a camera application and displaying a first interface, wherein the first interface comprises a first control for enabling a first function further comprises:
after starting the camera application, when a distance from the position information of the photo or the video to a current position of the electronic device is less than a third threshold, displaying the first interface, wherein the first interface comprises the first control for enabling the first function; or
after starting the camera application, when the gallery comprises the photo or the video having a month and day that is the same as that of a current date and a distance from the position information of the photo or the video to a current position of the electronic device is less than a fourth threshold, displaying the first interface, wherein the first interface comprises the first control for enabling the first function.

16. The method according to claim 1, further comprising:
obtaining a photographing parameter of the target template and prompting the user of whether to use the photographing parameter of the target template, wherein the photographing parameter comprises one or more of a photographing mode, a filter parameter, and a beauty parameter.

17. An electronic device, comprising: a processor, a memory, and a touch screen, wherein the memory and the touch screen are coupled to the processor, the memory is configured to store computer program code, the computer program code comprises computer instructions, and when the processor reads the computer instructions from the memory, the electronic device is caused to perform the following operations:
starting a camera application and displaying a first interface, wherein the first interface comprises a first control for enabling a first function;
displaying a second interface in response to a first user operation acting on the first control, wherein the second interface comprises a second control and the second control is used for selecting a target template;
displaying a third interface in response to a second user operation of selecting the target template, wherein the third interface comprises a first preview;
displaying instruction information, wherein the instruction information is used for instructing a user to move a position of an electronic device or an attitude of the electronic device;
displaying a fourth interface, wherein the fourth interface comprises a second preview and composition of the second preview is the same as that of the target template; and photographing a first photo or recording a first video in response to detecting a fifth user operation for indicating photographing, wherein when the target template is a video, composition of each frame image in the first video is the same as that of each frame image in the target template or composition of a first frame image and a last frame image in the first video is the same as that of a first frame image and a last frame image in the target template, respectively, or, composition of at least two frame images in the first video is the same as that of at least two frame images in the target template.

18. A non-transitory computer-readable storage medium, comprising: computer instructions, wherein the computer instructions, when run on an electronic device, cause the electronic device to perform the following operations:

starting a camera application and when a gallery having a photo or video comprises position information when a distance between a current position of the electronic device and the position information of the phot or the video is less than a third threshold, or when the photo or the video in the gallery has a month and day that is the same as that of a current date and a distance between the position information of the photo or the video and a current position of the electronic device is less than a fourth threshold, displaying a first interface, wherein the first interface comprises a first control for enabling a first function;

displaying a second interface in response to a first user operation acting on the first control, wherein the second interface comprises a second control and the second control is used for selecting a target template;

displaying a third interface in response to a second user operation of selecting the target template, wherein the third interface comprises a first preview;

displaying instruction information, wherein the instruction information is used for instructing a user to move a position of an electronic device or an attitude of the electronic device; and displaying a fourth interface, wherein the fourth interface comprises a second preview and composition of the second preview is the same as that of the target template.

19. The electronic device according to claim 17, wherein that composition of the second preview is the same as that of the target template comprises at least one of the following:

the second preview and the target template each comprise a first object, and a position of the first object in the second preview is the same as a position of the first object in the target template;

the second preview and the target template each comprise a first type of object, and a position of the first type of object in the second preview is the same as a position of the first type of object in the target template; and the second preview and the target template each comprise a character, and a position or a pose of the character in the second preview is the same as a position or a pose of the character in the target template, respectively, wherein the character in the second preview and the character in the target template are a same person or different persons.

20. The electronic device according to claim 17, wherein the electronic device further performs the following operations:

performing feature point matching on the target template and the first preview, and calculating a moving direction and a moving distance of the electronic device or calculating an attitude rotation direction and a rotation angle of the electronic device based on corresponding positions of feature points with a same name in the target template and the first preview.

* * * * *